(12) United States Patent  
Beuret et al.

(10) Patent No.: US 12,446,812 B2  
(45) Date of Patent: Oct. 21, 2025

(54) BODY FLUID METER ASSEMBLY, IN PARTICULAR FOR MEASURING DIURESIS

(71) Applicant: Diuriflux Medical SA, Chernex (CH)

(72) Inventors: Philippe Beuret, Chernex (CH); Nicolas Goy, Yvorne (CH); Jean-Jacques Goy, Chanéaz (CH)

(73) Assignee: Diuriflux Medical SA, Chernex (CH)

( * ) Notice: Subject to any disclaimer, the term of this patent is extended or adjusted under 35 U.S.C. 154(b) by 978 days.

(21) Appl. No.: 17/617,150

(22) PCT Filed: Jun. 17, 2020

(86) PCT No.: PCT/IB2020/055628  
§ 371 (c)(1),  
(2) Date: Dec. 7, 2021

(87) PCT Pub. No.: WO2020/254970  
PCT Pub. Date: Dec. 24, 2020

(65) Prior Publication Data  
US 2022/0233120 A1    Jul. 28, 2022

(30) Foreign Application Priority Data  
Jun. 17, 2019  (EP) .................................... 19180577

(51) Int. Cl.  
*A61B 5/20* (2006.01)  
*A61B 5/00* (2006.01)  
*A61B 10/00* (2006.01)

(52) U.S. Cl.  
CPC ............ *A61B 5/208* (2013.01); *A61B 5/0004* (2013.01); *A61B 5/7225* (2013.01);  
(Continued)

(58) Field of Classification Search  
None  
See application file for complete search history.

(56) References Cited

U.S. PATENT DOCUMENTS

| 4,712,567 A | 12/1987 | Gille et al. |
| 2006/0052764 A1 | 3/2006 | Gelfand et al. |

(Continued)

FOREIGN PATENT DOCUMENTS

| WO | 2006031249 A2 | 3/2006 |
| WO | 2014036769 A1 | 3/2014 |
| WO | 2017149272 A1 | 9/2017 |

OTHER PUBLICATIONS

International Search Report; European Patent Office; International Application No. PCT/IB2020/055628; Oct. 9, 2020; 3 pages.

(Continued)

*Primary Examiner* — Aurelie H Tu  
(74) *Attorney, Agent, or Firm* — Taft Stettinius & Hollister LLP

(57) ABSTRACT

A body fluid meter assembly for measuring diuresis including a body fluid collection container configured to collect body fluid such as urine, a body fluid meter unit including a load cell and a coupling mechanism configured to releasably couple the collection container to the load cell, which body fluid meter unit is configured to process sensor data supplied by the load cell and derive a measurement of a quantity and/or flow rate of the body fluid in the collection container as a function of load applied on the load cell, and tubing attached to an inlet port of the collection container and configured to be connected to a source of the body fluid. The collection container is a substantially rigid container and the coupling mechanism is a spring-loaded interlocking mechanism configured to cooperate with one or more interlocking members to interlock with the collection container to form a stable connection.

55 Claims, 19 Drawing Sheets

(52) U.S. Cl.
CPC .... *A61B 10/007* (2013.01); *A61B 2560/0443* (2013.01); *A61B 2562/0219* (2013.01)

(56) References Cited

U.S. PATENT DOCUMENTS

| | | |
|---|---|---|
| 2010/0228148 A1 | 9/2010 | Kim |
| 2016/0051176 A1* | 2/2016 | Ramos .................. G01F 23/265 600/573 |
| 2016/0051177 A1 | 2/2016 | Chen |
| 2017/0055874 A1* | 3/2017 | Papirov .................... A61B 5/07 |
| 2017/0307423 A1 | 10/2017 | Pahwa et al. |
| 2018/0214297 A1 | 8/2018 | Hughett et al. |
| 2019/0069830 A1 | 3/2019 | Holt et al. |

OTHER PUBLICATIONS

Written Opinion of the International Searching Authority; European Patent Office; International Application No. PCT/IB2020/055628; Oct. 9, 2020; 7 pages.

* cited by examiner

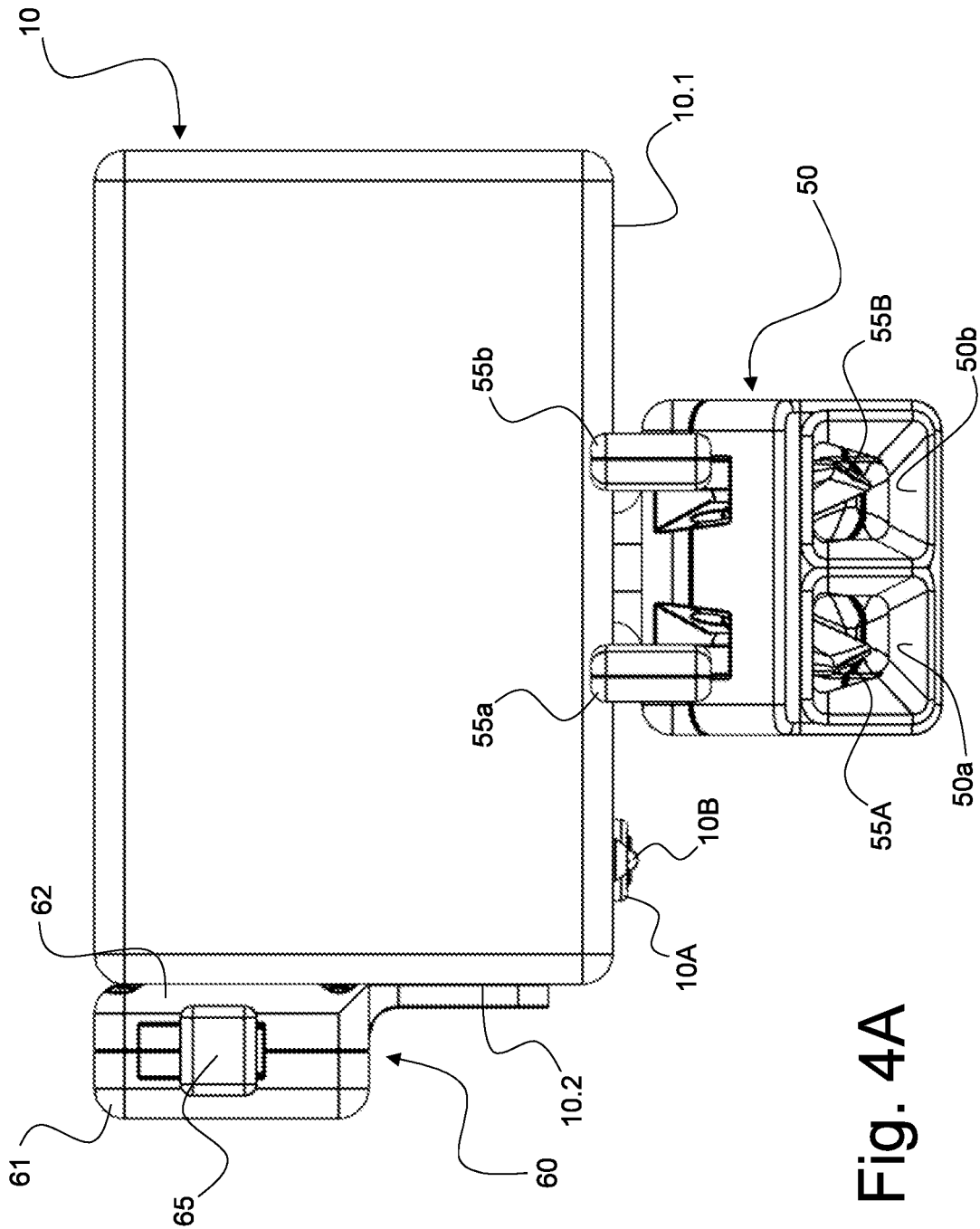

BODY FLUID METER ASSEMBLY, IN PARTICULAR FOR MEASURING DIURESIS

CROSS REFERENCE TO RELATED APPLICATIONS

This application is a U.S. national stage filing of International Patent Application No. PCT/IB2020/055628 filed Jun. 17, 2020, which claims priority to European Application No. 19180577.9 filed Jun. 17, 2019, the contents of each application are hereby incorporated by reference in their entirety.

TECHNICAL FIELD

The present invention generally relates to a body fluid meter assembly, which invention is in particular intended to be applied for the purpose of measuring diuresis. The invention also relates to a body fluid collection container and a body fluid meter unit suitable for use as part of the body fluid meter assembly.

BACKGROUND OF THE INVENTION

Body fluid meter assemblies are known as such in the art, especially for measuring diuresis.

Collection of urine output is typically carried out by catheterizing the patient, namely by passing a urinary catheter through the urethra of the patient and connecting the other end of the urinary catheter to a container or drainage bag through a length of flexible tubing. Typically, the container or bag collecting urine is supported below the patient from the patient's bed or an associated support system, and urine drains by gravity from the patient through the flexible tubing and into the container or bag.

A widespread solution for measuring diuresis consists in making manual, visual readings directly on the container or bag collecting urine. Many of these systems use urine collection bags formed of a clear and flexible plastic material provided with indicia in the form of graduations that represents the volume of urine being collected in the bag. In other systems, the urine collection receptacle includes a rigid and clear plastic reservoir in fluid communication with an additional collection bag, the reservoir being likewise provided with indicia in the form of graduations that represents the volume of urine being collected in the reservoir. In this latter case, urine initially flows and is stored in the reservoir, which acts as a measurement chamber, prior to being emptied into the additional collection bag. A determination of the quantity of urine being collected is performed visually at periodic intervals by means of the relevant graduations, which allows to derive an indication of the flow rate of urine. This solution is not entirely satisfactory in that measurement readings on the graduations are inherently inaccurate and dependent upon the caregiver making the relevant measurement readings at precise time intervals. Furthermore, measurement readings are sometimes difficult to make depending on where the system is located. This solution moreover requires emptying the bag or reservoir at regular intervals so that it has room to be filled again.

U.S. Pat. No. 4,712,567 A, which is incorporated herein by reference in its entirety, discloses a body fluid meter assembly used for the purpose of measuring diuresis, i.e. monitoring and measuring the quantity of urine produced by a patient during urination. More precisely, the assembly comprises a drainage collection bag configured to collect urine, a measuring and processing unit comprising a load cell and a coupling mechanism configured to releasably couple the drainage collection bag to the load cell, and flexible tubing attached to an inlet port of the drainage collection bag and configured to be connected to a urinary catheter. The drainage collection bag is coupled mechanically to the load cell via a handle assembly that is secured to an upper portion of the bag, which handle assembly is supported onto a pair of arms secured to the load cell. The measuring and processing unit processes sensor data supplied by the load cell and derives a measurement of the amount of urine being collected. In effect, the measuring and processing unit measures urine amount with regard to its weight and converts weight to volume by accounting for urine volumetric mass density. The variation of urine volume over time provides a reliable indication of the urine flow rate, which can be used to monitor the evolution of the clinical condition of the patient.

The coupling mechanism disclosed in U.S. Pat. No. 4,712,567 A to couple the drainage collection bag to the load cell is not robust or reliable enough, especially in that the drainage collection bag can be inadvertently released, which is not desirable. Furthermore, movements or shocks can unsettle the drainage collection bag and cause erroneous sensor measurements.

Other similar solutions are known in the art, for instance from International (PCT) Publications Nos. WO 2006/031249 A2, WO 2014/036769 A1, WO 2017/149272 A1, US Patent Publication No. US 2010/0228148 A1 and US Patent Publication No. US 2017/0307423 A1. All of these solutions suffer from substantially the same drawbacks as the solution disclosed in U.S. Pat. No. 4,712,567 A, namely an unreliable and unstable connection between the measuring and processing unit and the collection bag.

There is therefore a need for a solution which prevents inadvertent release of the container used to collect the body fluid and ensures a more reliable and stable connection between the container and the associated measuring and processing unit, while not compromising handling operations.

US Patent Publication No. US 2018/0214297 A1 discloses a urine output collection and monitoring system that does not rely upon the use of a load cell to derive a measurement of a quantity and/or flow rate of urine accumulating in a urine collection container. Rather, such measurement is derived by optical means, namely using a light detector array detecting a fan beam signal emitted by a light source through a portion of the urine collection container where urine accumulates.

SUMMARY OF THE INVENTION

A general aim of the invention is to provide an improved body fluid meter assembly.

More precisely, an aim of the invention is to provide such a solution which prevents inadvertent release of the body fluid collection container from the coupling mechanism of the associated body fluid meter unit.

A further aim of the invention is to provide such a solution which ensures a reliable and stable connection between the body fluid collection container and the associated body fluid meter unit.

Yet another aim of the invention is to provide such a solution where assembly and disassembly of the body fluid collection container is easy to handle.

These aims are achieved thanks to the solutions defined in the claims.

In accordance with the invention, there is provided a body fluid meter assembly, in particular for measuring diuresis, as defined in claim 1, namely a body fluid meter assembly comprising (i) a body fluid collection container configured to collect body fluid, such as urine, (ii) a body fluid meter unit comprising a load cell and a coupling mechanism configured to releasably couple the body fluid collection container to the load cell, which body fluid meter unit is configured to process sensor data supplied by the load cell and derive a measurement of a quantity and/or flow rate of the body fluid accumulating in the body fluid collection container as a function of load applied on the load cell, and (iii) tubing attached to an inlet port of the body fluid collection container and configured to be connected to a source of the body fluid. According to the invention, the body fluid collection container is a substantially rigid container and the coupling mechanism is a spring-loaded interlocking mechanism configured to cooperate with one or more interlocking members provided on the body fluid collection container and interlock with the body fluid collection container to form a stable connection between the body fluid meter unit and the body fluid collection container.

In accordance with a preferred embodiment, the spring-loaded interlocking mechanism comprises at least one spring-loaded release lever comprising a locking portion configured to cooperate with a locking section (preferably shaped as a locking indentation) provided on a corresponding one of the one or more interlocking members. In particular, each spring-loaded release lever may be supported so as to pivot between a first position in which the locking portion of the spring-loaded release lever engages with the locking section of the corresponding interlocking member and prevents disengagement of the body fluid collection container and a second position in which the locking portion of the spring-loaded release lever is disengaged from the locking section of the corresponding interlocking member and allows disengagement of the body fluid collection container.

In accordance with an embodiment of the invention, the body fluid collection container comprises at least one locking extension acting as interlocking member and projecting from the body fluid collection container, each locking extension being configured to mate with a corresponding locking aperture provided on the spring-loaded interlocking mechanism. More specifically, referring to the preferred embodiment discussed in the preceding paragraph, the body fluid collection container preferably comprises first and second locking extensions acting as interlocking members and projecting from the body fluid collection container, each locking extension being configured to mate with a corresponding locking aperture provided on the spring-loaded interlocking mechanism. In this latter preferred context, the spring-loaded interlocking mechanism comprises first and second spring-loaded release levers cooperating respectively with the first and second locking extensions.

Each of the aforementioned locking extensions may in particular project substantially horizontally from the body fluid collection container, preferably rearward from a front side of the body fluid collection container.

In accordance with a particularly preferred embodiment, the spring-loaded interlocking mechanism extends from a lower side of the body fluid meter unit and an upper portion of the body fluid collection container exhibits a recess configured to receive the spring-loaded interlocking mechanism, each interlocking member being located within the recess. This ensures reliable guidance of the body fluid collection container upon engaging or disengaging the body fluid collection container from the spring-loaded interlocking mechanism.

By way of preference, a portion of the tubing is secured to a lateral side of the body fluid meter unit. In particular, the tubing may advantageously include a drip chamber placed upstream of the inlet port of the body fluid collection container. In this latter context, the body fluid meter unit may further comprise a secondary spring-loaded interlocking mechanism provided on the lateral side of the body fluid meter unit, which secondary spring-loaded interlocking mechanism is configured to cooperate and interlock with one or more lateral interlocking members provided on an outer portion of the drip chamber. This ensures that any tension applied on the tubing will not cause inadvertent movement of the body fluid collection container that may otherwise interfere with the measurement process. The inlet port of the drip chamber is preferably provided with a venting air inlet including an antibacterial air filtration membrane, which ensures optimal flow of the body fluid at the inlet port and prevents bacterial contamination.

The aforementioned secondary spring-loaded interlocking mechanism may in particular comprise at least one secondary spring-loaded release lever comprising at least one locking portion configured to cooperate with a locking section (preferably shaped as a locking indentation) provided on a corresponding one of the one or more lateral interlocking members. Preferably, the secondary spring-loaded release lever is supported so as to pivot between a first position in which the locking portion of the secondary spring-loaded release lever engages with the locking section of the corresponding lateral interlocking member and prevents disengagement of the drip chamber and a second position in which the locking portion of the secondary spring-loaded release lever is disengaged from the locking section of the corresponding lateral interlocking member and allows disengagement of the drip chamber.

In accordance with a variant of the invention, the drip chamber comprises at least one lateral locking extension acting as lateral interlocking member and projecting outwardly from the drip chamber, each lateral locking extension being configured to mate with a corresponding locking aperture provided on the secondary spring-loaded interlocking mechanism. More specifically, referring to the embodiment discussed in the preceding paragraph, the drip chamber preferably comprises first and second lateral locking extensions acting as lateral interlocking members and projecting from the drip chamber, each lateral locking extension being configured to mate with a corresponding locking aperture provided on the secondary spring-loaded interlocking mechanism. In this latter preferred context, the secondary spring-loaded interlocking mechanism comprises only one said secondary spring-loaded release lever cooperating with both of the first and second lateral locking extensions.

By way of preference, the tubing further includes a flexible tubing portion interposed between an outlet port of the drip chamber and the inlet port of the body fluid collection container. This flexible tubing portion may in particular be configured as a coiled tubing portion.

In accordance with another aspect of the invention, the body fluid meter unit comprises a processing unit in operative communication with an analog-to-digital (A/D) converter coupled to the load cell to convert analog signals from the load cell into digital sensor data, the processing unit being configured to digitally process the sensor data supplied by the analog-to-digital (ND) converter to derive the measurement of the quantity and/or flow rate of the body fluid accumulating in the body fluid collection container. Preferably, the processing unit is in further operative communication with one or more of the following electronic components of the body fluid meter unit, namely:

a wireless transceiver configured to establish a wireless communication with a remote receiver and communicate data wirelessly to the remote receiver;

a near-field communication (NFC) transceiver configured to establish a near-field communication link with an external NFC device;

a battery controller coupled to a battery, in particular a rechargeable battery, supplying power to the body fluid meter unit, which battery controller is configured to monitor a charge status of the battery; and an accelerometer configured to detect and monitor movement of the body fluid meter unit.

Further claimed in independent claim 27 is a body fluid collection container configured to collect body fluid, such as urine, the body fluid collection container being suitable for use as part of the aforementioned body fluid meter assembly, which body fluid collection container is a substantially rigid container comprising one or more interlocking members configured to cooperate and interlock with the spring-loaded interlocking mechanism of the body fluid meter unit. This body fluid collection container is preferably further characterized by the relevant features of the body fluid collection container discussed hereabove in connection with the body fluid meter assembly of the invention, which preferred features are recited in dependent claims 28 to 34.

Also claimed in independent claim 35 is a body fluid meter unit suitable for use as part of the aforementioned body fluid meter assembly, which body fluid meter unit comprises a load cell and a coupling mechanism configured to releasably couple the body fluid collection container of the body fluid meter assembly to the load cell, the body fluid meter unit being configured to process sensor data supplied by the load cell and derive a measurement of a quantity and/or flow rate of the body fluid accumulating in the body fluid collection container as a function of load applied on the load cell. The coupling mechanism is likewise a spring-loaded interlocking mechanism configured to cooperate and interlock with one or more interlocking members provided on the body fluid collection container. This body fluid meter unit is preferably further characterized by the relevant features of the body fluid meter unit discussed hereabove in connection with the body fluid meter assembly of the invention, which preferred features are recited in dependent claims 36 to 53.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which:

FIG. 4A is a front view of the body fluid meter unit forming part of the assembly shown in FIGS. 1A to 1C;

DETAILED DESCRIPTION OF EMBODIMENTS OF THE INVENTION

The present invention will be described in relation to various illustrative embodiments. It shall be understood that the scope of the invention encompasses all combinations and sub-combinations of the features of the embodiments disclosed herein.

As described herein, when two or more parts or components are described as being connected, secured, attached or coupled to one another, they can be so connected, secured, attached or coupled directly to each other or through one or more intermediary parts.

Figure 1A:
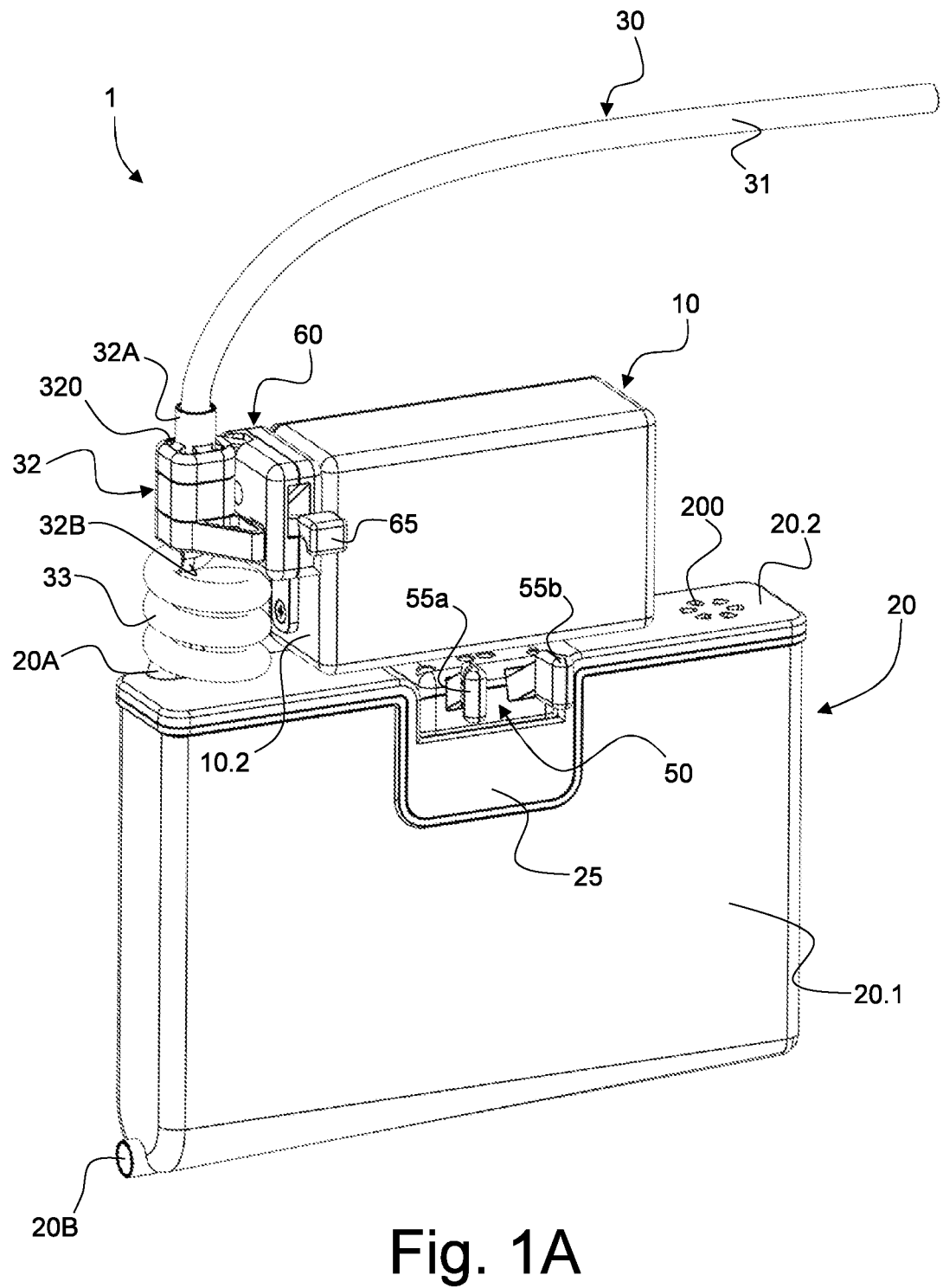
FIG. 1A is a schematic perspective view of a body fluid meter assembly, as seen from a front side, in accordance with a preferred embodiment of the invention, which body fluid meter assembly includes a body fluid meter unit that is coupled to a body fluid collection container via a spring-loaded interlocking mechanism.
Figure 1B:
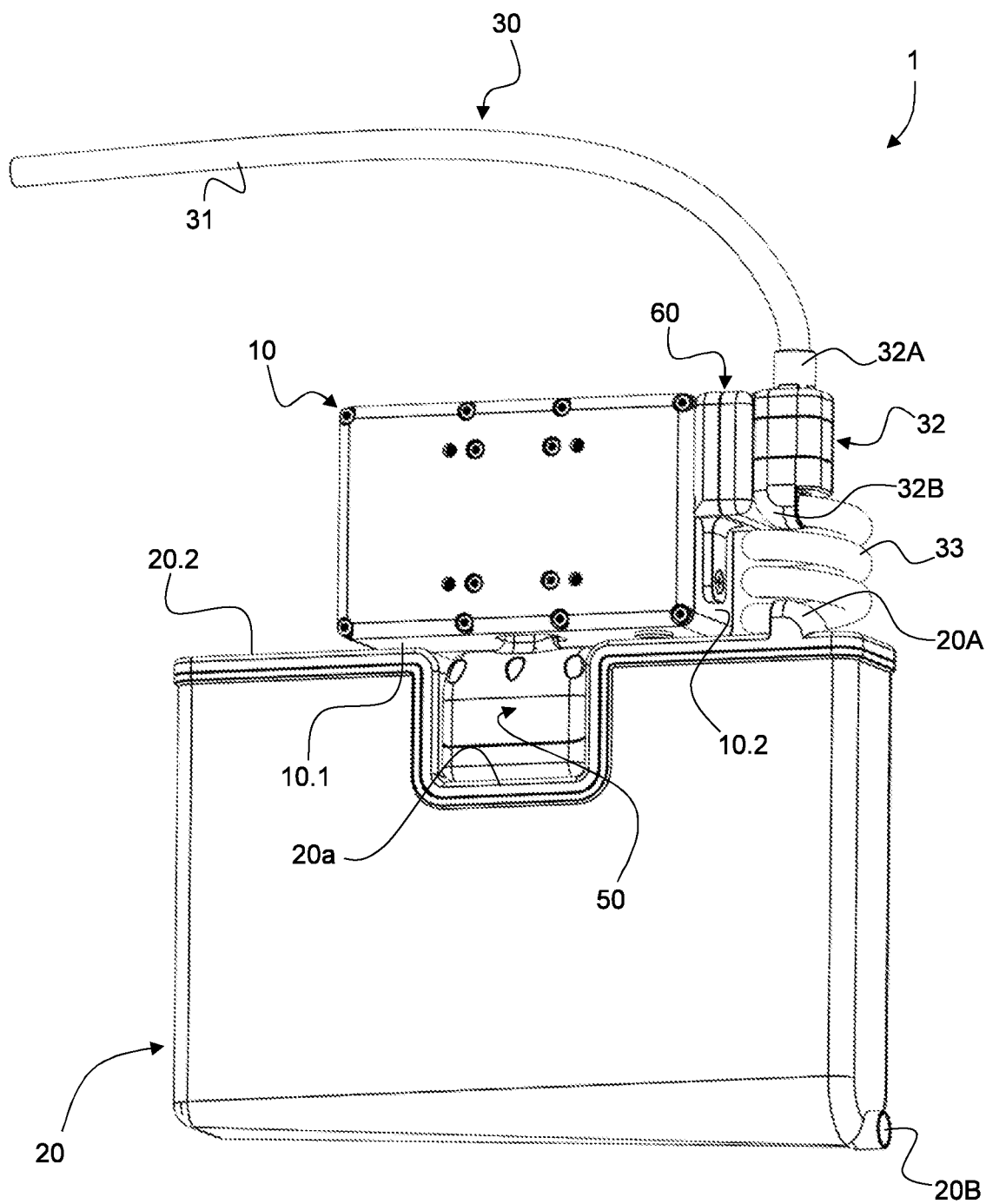
FIG. 1B is a schematic perspective view of the body fluid meter assembly of FIG. 1A, as seen from a rear side.
Figure 8:
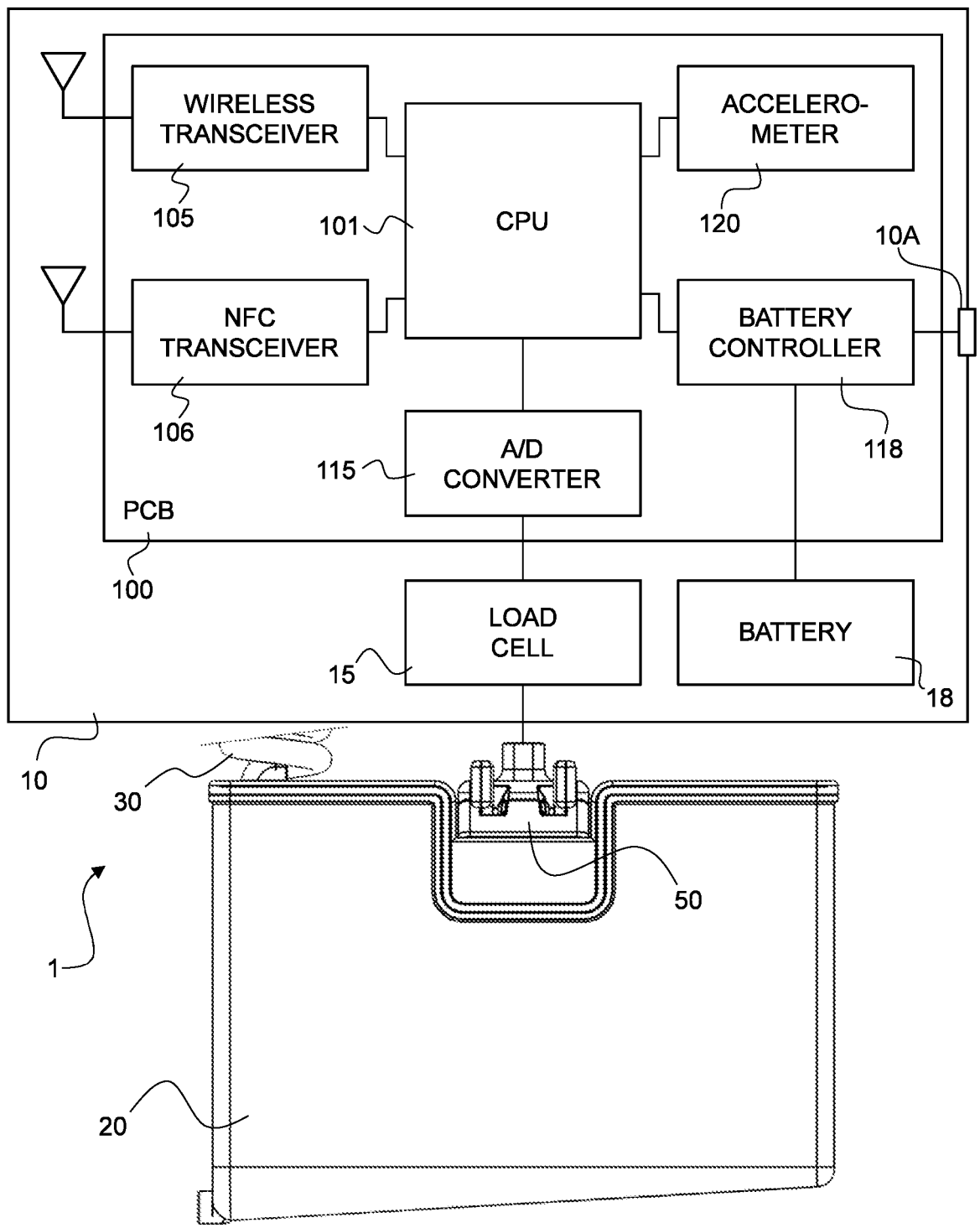
FIG. 8 is a functional block diagram illustrating functional electronic components of the body fluid meter unit according to a preferred embodiment.

The invention will be described in relation to various embodiments of a body fluid meter assembly as shown in FIGS. 1A-B to 8, which assembly is especially intended to measure diuresis.

Figure 1C:
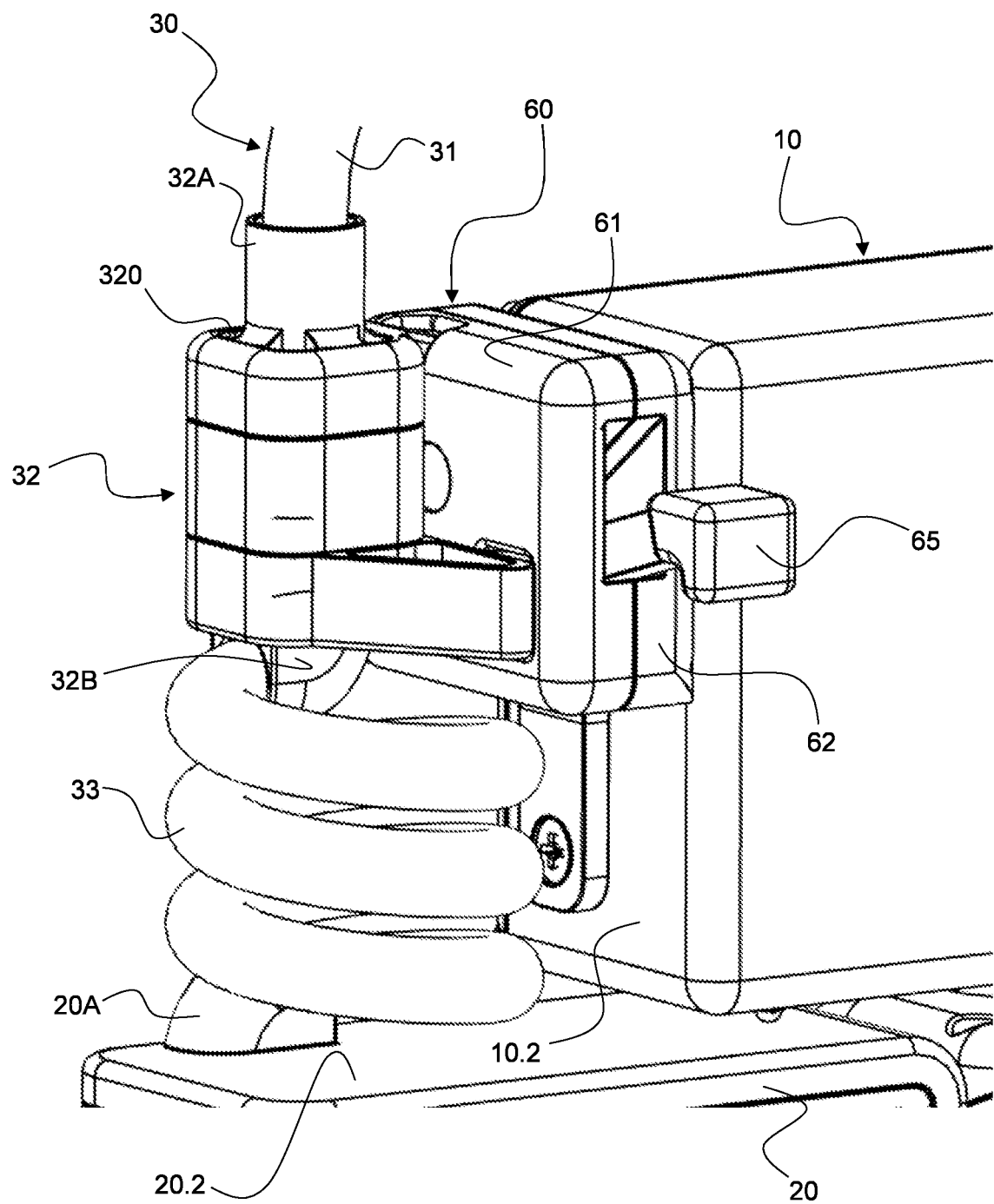
FIG. 1C is an enlarged partial perspective view of a lateral side of the body fluid meter unit of FIGS. 1A and 1B, where tubing is attached to an inlet port of the body fluid collection container.

FIGS. 1A to 1C are illustrative of a particularly preferred embodiment of the body fluid meter assembly according to the invention, which assembly is generally designated by reference numeral 1. The body fluid meter assembly 1 basically includes three main components, namely a body fluid meter unit 10, a body fluid collection container 20 configured to collect body fluid (i.e. urine in the present example), and tubing 30 attached to an inlet port 20A of the body fluid collection container 20 and configured to be connected to a source of the body fluid (namely a urinary catheter in the present instance, not shown) by means of tubing portion 31. While not specifically shown, the inlet port 20A may advantageously be provided with an anti-reflux valve to prevent retrograde flow of urine into the tubing 30, thereby preventing retrograde migration of bacteria.

The body fluid meter unit 10 comprises a load cell (not shown in FIGS. 1A to 1C, but visible in FIG. 6) and a coupling mechanism configured to releasably couple the body fluid collection container to the load cell (see also the functional diagram of FIG. 8). The body fluid meter unit 10 is in essence configured to process sensor data supplied by the load cell and derive a measurement of a quantity and/or flow rate of the urine accumulating in the body fluid collection container 20 as a function of load applied on the load cell. The basic measurement principle is known per se in the art, for instance from U.S. Pat. No. 4,712,567 A, the disclosure of which is incorporated herein by reference in its entirety.

In use, the body fluid meter unit 10 is attached to a bed frame, or to a separate, stable support structure, by means of a suitable attachment mechanism (not shown), such as fastening straps or clamps. A suitable attachment mechanism may in particular be provided on a rear side of the body fluid meter unit 10.

Improvements are achieved in terms of measurement accuracy and reliability thanks to the invention. More specifically, in the context of the present invention, use is made of a substantially rigid container as the body fluid collection container 20, which ensures that accumulation of urine in the container is made in a deterministic way and does not lead to uncontrolled deformation of the collection container, which could negatively impact measurement accuracy and reliability. In that regard, the body fluid collection container 20 can be made of any suitably rigid material, including plastic materials, such as polycarbonates. The material can be opaque or substantially transparent, in which case the container 20 could additionally be provided with graduations, as known in the art, to allow visual measurements of the diuresis.

As is conventional in the art, the container 20 may be provided with a drainage port 20B to allow emptying of the container 20. While not shown, a suitable, manually-actuatable rotary flush valve could be provided at the drainage port 20B to facilitate the emptying operation. In that respect, an upper side 20.2 of the body fluid collection container 20 can additionally be provided with a venting air inlet 200 (with antibacterial air filtration membrane) which ensures optimal and quick emptying of the container 20.

Furthermore, the coupling mechanism used to couple the container 20 to the meter unit 10 is specifically designed as a spring-loaded interlocking mechanism, designated by reference numeral 50, that is configured to cooperate with one or more interlocking members (not visible in FIGS. 1A to 1C) provided on the container 20. This is a fundamental difference compared to the known solutions that make use of rather rudimentary handle and hook arrangements. Thanks to the invention, a stable connection is formed between the body fluid meter unit 10 and the body fluid collection container 20. Furthermore, inadvertent release of the container 20 from the meter unit 10 is prevented. While more robust and reliable, this solution does not negatively impact handling operations, as the container 20 can easily be coupled to or uncoupled from the meter unit 10 by simple engagement or disengagement of the interlocking mechanism 50 as this will be explained below.

In the illustrated example, a pair of interlocking members are provided for cooperation with the spring-loaded locking mechanism 50, as shown for instance in FIG. 2A and FIGS. 3A to 3D. More precisely, first and second locking extensions 250a, 250b acting as interlocking members are provided, which locking extensions 250a, 250b project from the body fluid collection container 20. By way of preference, as shown, each locking extension 250a, 250b projects substantially horizontally from the body fluid collection container 20, namely rearward from a front side 20.1 of the body fluid collection container 20. In the illustrated example, the locking extensions are advantageously located within a recess 20a formed in an upper portion of the body fluid collection container 20, the locking extensions 250a, 250b being supported by and projecting rearward from a wall section 25 extending partly in the recess 20a, along the front side 20.1 of the container 20 (see especially FIGS. 3A to 3D).

Figure 4B:
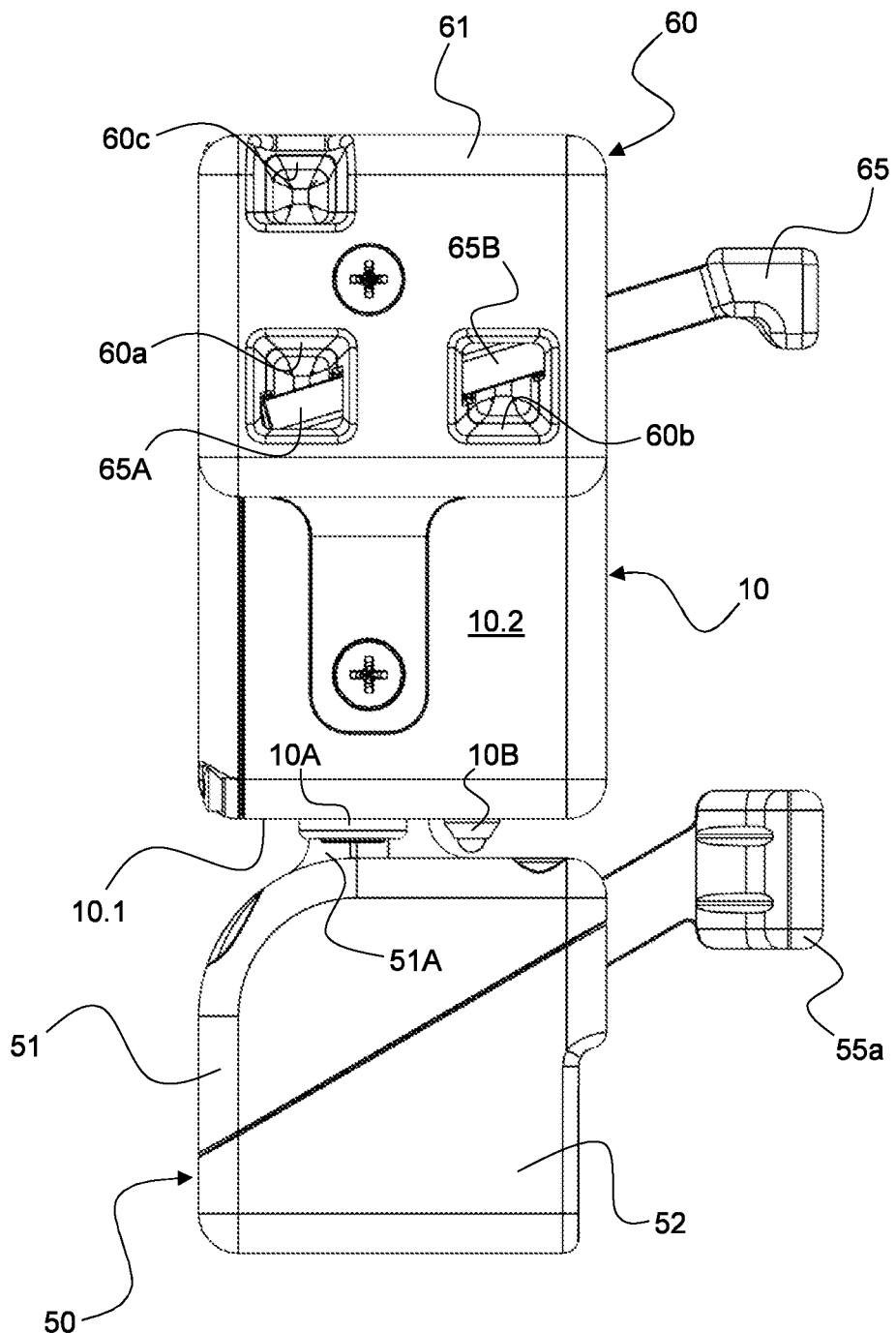
FIG. 4B is a side view of the body fluid meter unit of FIG. 4A.
Figure 4C:
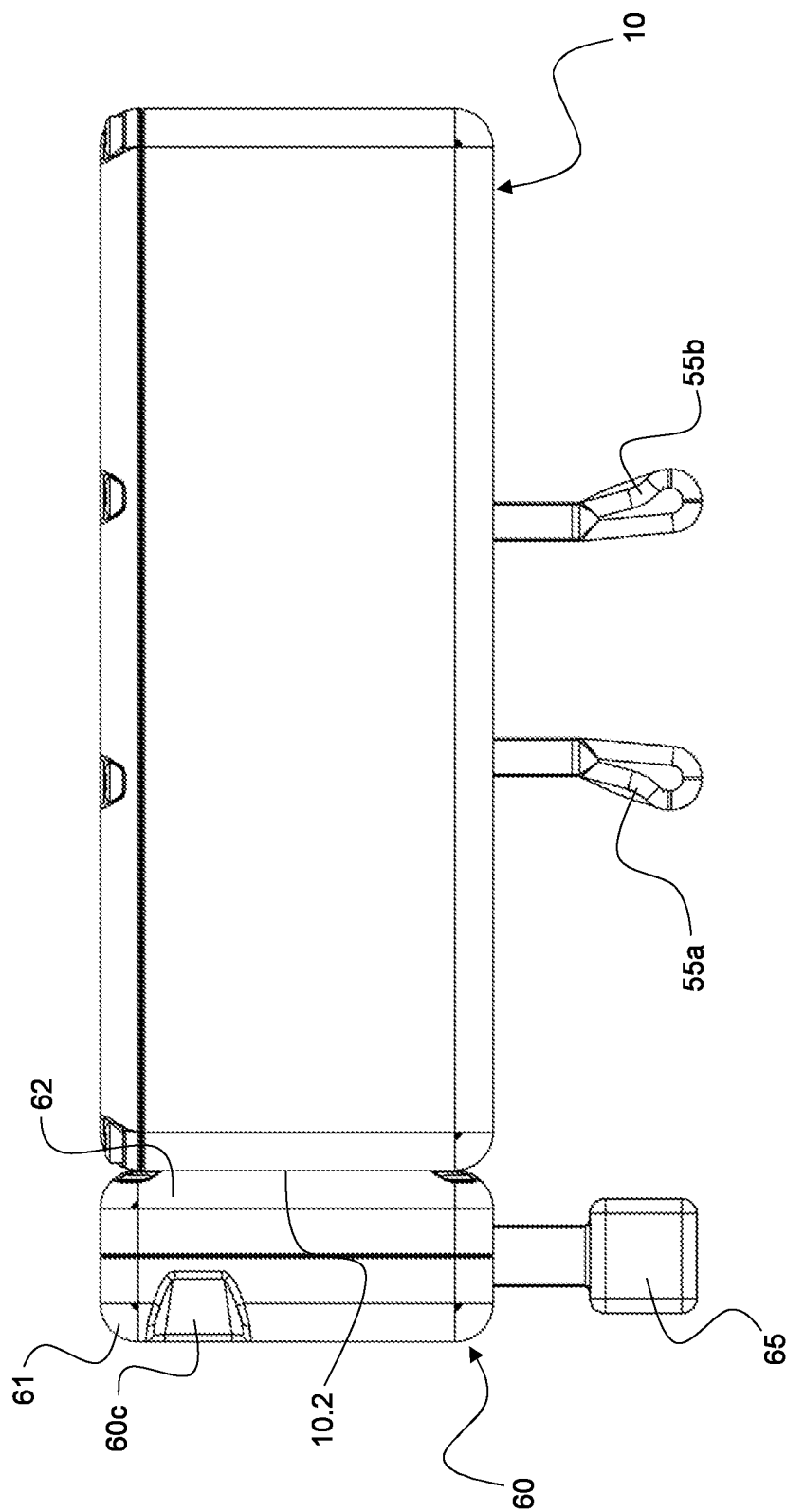
FIG. 4C is a top view of the body fluid meter unit of FIG. 4A.
Figure 4D:
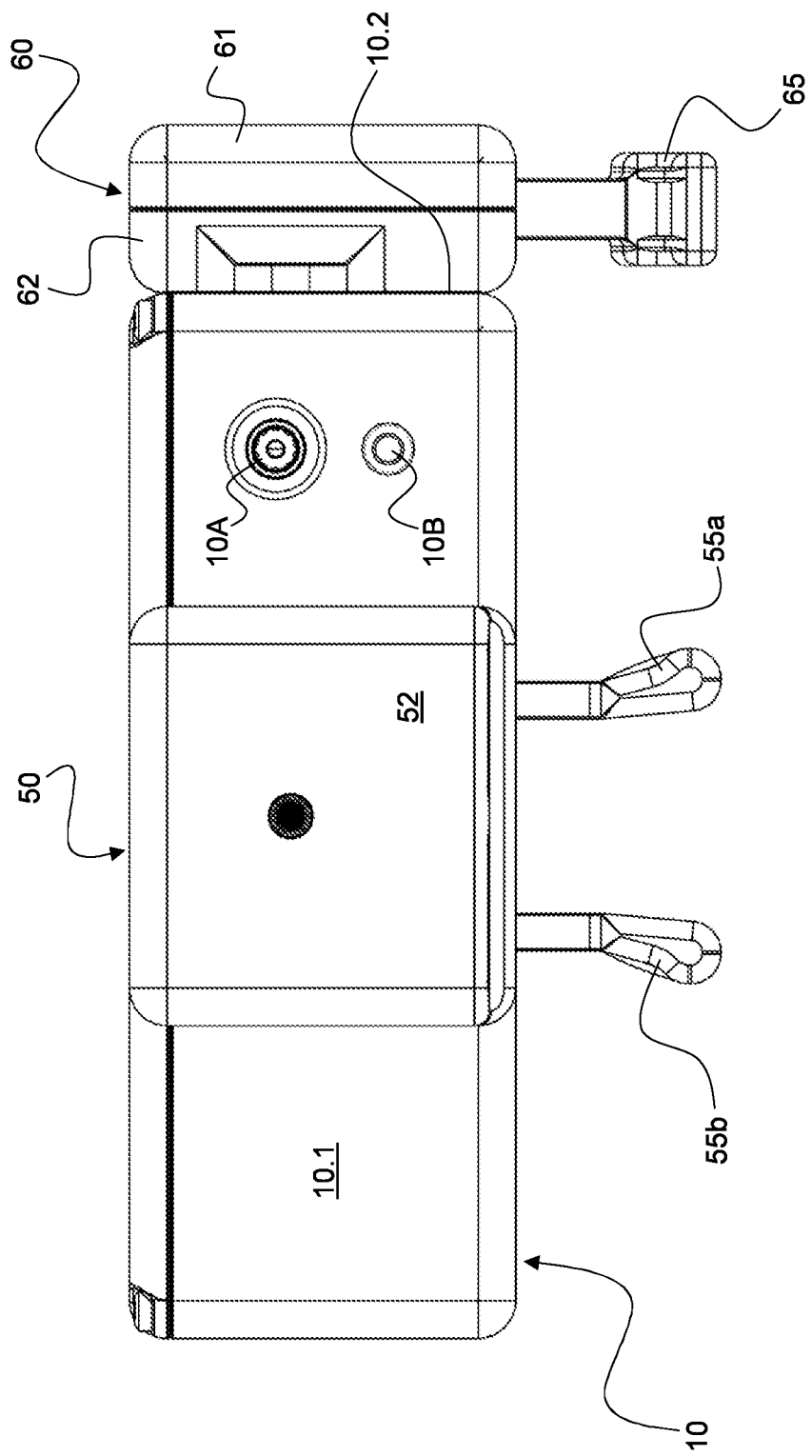
FIG. 4D is a bottom view of the body fluid meter unit of FIG. 4A.
Figure 4E:
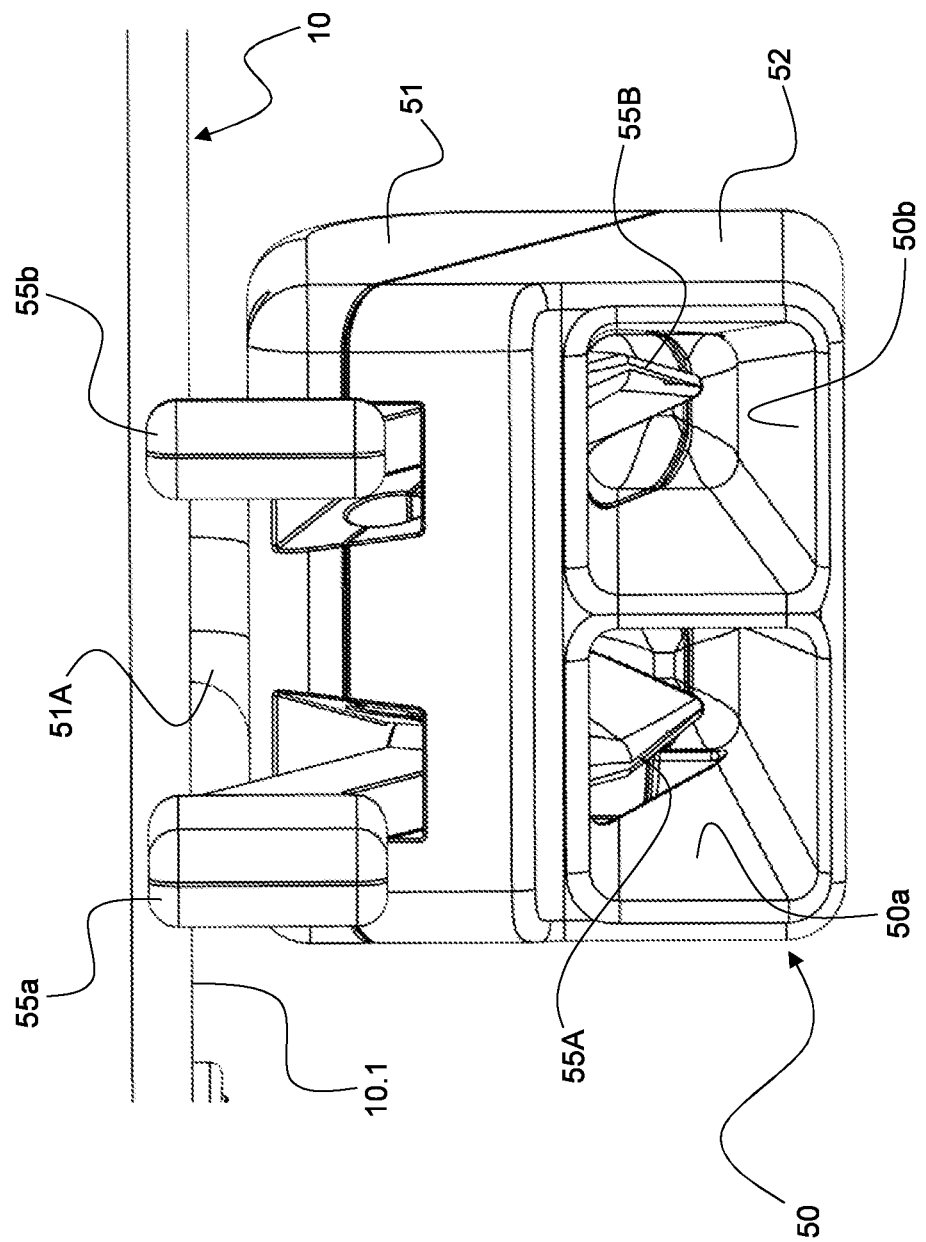
FIG. 4E is an enlarged partial perspective view of the spring-loaded interlocking mechanism of the body fluid meter unit of FIG. 4A.
Figure 6:
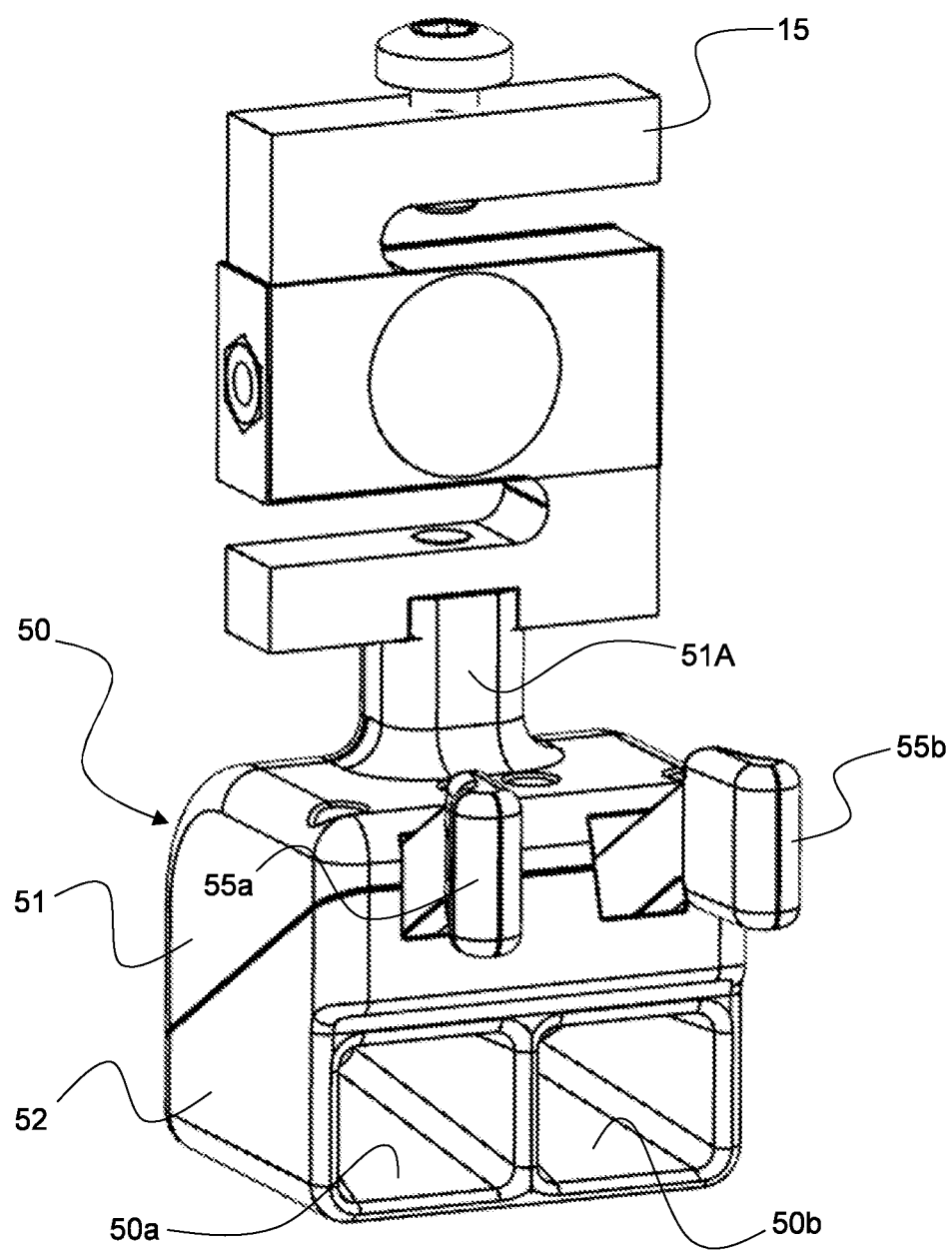
FIG. 6 is a partial perspective view of the spring-loaded interlocking mechanism of FIG. 4E secured to a load cell of the body fluid meter unit.

The locking extensions 250a, 250b are configured to mate with corresponding locking apertures 50a, 50b provided on the spring-loaded interlocking mechanism 50, as shown in particular in FIGS. 4A, 4E and 6. The overall shape of the locking extensions 250a, 250b and associated locking apertures 50a, 50b may vary, but are preferably chosen in such a way as to facilitate engagement and disengagement of the interlocking mechanism 50 with or from the locking extensions 250a, 250b and ensure a stable and reliable guidance and support of the container 20.

In the illustrated example, one may appreciate that the spring-loaded interlocking mechanism 50 advantageously extends from a lower side 10.1 of the body fluid meter unit 10 and that the recess 20a formed in the upper portion of the body fluid collection container 20 is configured to entirely receive the spring-loaded interlocking mechanism 50, which also favors and facilitates engagement and disengagement of the container 20. The recess 20a in effect advantageously acts as a guide for engagement and disengagement of the container 20 with respect to the spring-loaded interlocking mechanism 50. This also leads to an overall compact assembly as depicted in FIGS. 1A and 1B.

As shown in greater detail in FIG. 6, the spring-loaded interlocking mechanism 50 is directly coupled to the associated load cell, designated by reference numeral 15, of the body fluid meter unit 10, which load cell 15 is housed within the unit 10. To this end, an upper housing part 51 of the spring-loaded interlocking mechanism 50 is provided with an extension 51A (also partly visible in FIG. 4E) projecting upward through a corresponding opening (not shown)

formed in the lower side 10.1 of the body fluid meter unit 10. This upper housing part 51 is secured to a lower housing part 52 to house the various mechanical components of the spring-loaded interlocking mechanism 50 which will be detailed hereafter.

As this is readily visible in FIG. 6, the load cell 15 is preferably an S-type load cell comprising an S-shaped block that is secured, at an upper end, to a suitable portion of the body fluid meter unit 10 and, at a lower end, to the spring-loaded interlocking mechanism 50 (and the associated container 20, when engaged), thereby allowing a measurement of the load applied on the load cell 15. S-type load cells (as well as other types of load cells) are commercially available on the market, for instance from company Mettler-Toledo (Schweiz) GmbH (www.mt.com), and are used for a large variety of applications. Load cells with increased resistance to traction (exceeding e.g. 100 kg of traction or more) are of particular interest with a view to prevent damage to the load cell, for instance as a result of the body fluid collection container 20 getting stuck during movement of the patient's bed or someone stepping up on the body fluid collection container 20.

By way of preference, the spring-loaded interlocking mechanism 50 comprises at least one spring-loaded release lever cooperating with the aforementioned one or more interlocking members. More precisely, in the illustrated example, two such spring-loaded release levers 55a, 55b are provided, as shown in FIGS. 1A, 4A to 4E, 5 and 6, for cooperation with, respectively, the first and second locking extensions 250a, 250b. Each of these spring-loaded release levers 55a, 55b comprises a locking portion 55A, respectively 55B, that is partly visible in FIGS. 4A and 4E and more fully in FIG. 5. Each locking portion 55A, 55B is configured to cooperate with a locking section 250A, respectively 250B, provided on the corresponding interlocking member 250a, 250b. In the illustrated example, the locking sections 250A, 250B advantageously take the shape of locking indentations (see also FIGS. 2A and 3A to 3D) formed at a distal end of the locking extensions 250a, 250b. As shown in greater detail in FIG. 5 (where the upper housing part 51 of the spring-loaded interlocking mechanism 50 has been omitted for the purpose of illustration), each locking portion 55A, 55B engages with the associated locking indentation 250A, respectively 250B, upon full engagement of the container 20 with the spring-loaded interlocking mechanism 50, thereby locking the container 20 in place. Conversely, disengagement of the locking portions 55A, 55B from the associated locking indentations 250A, 250B frees the locking extensions 250a, 250b, thereby allowing disengagement of the container 20 from the interlocking mechanism 50.

Figure 5:
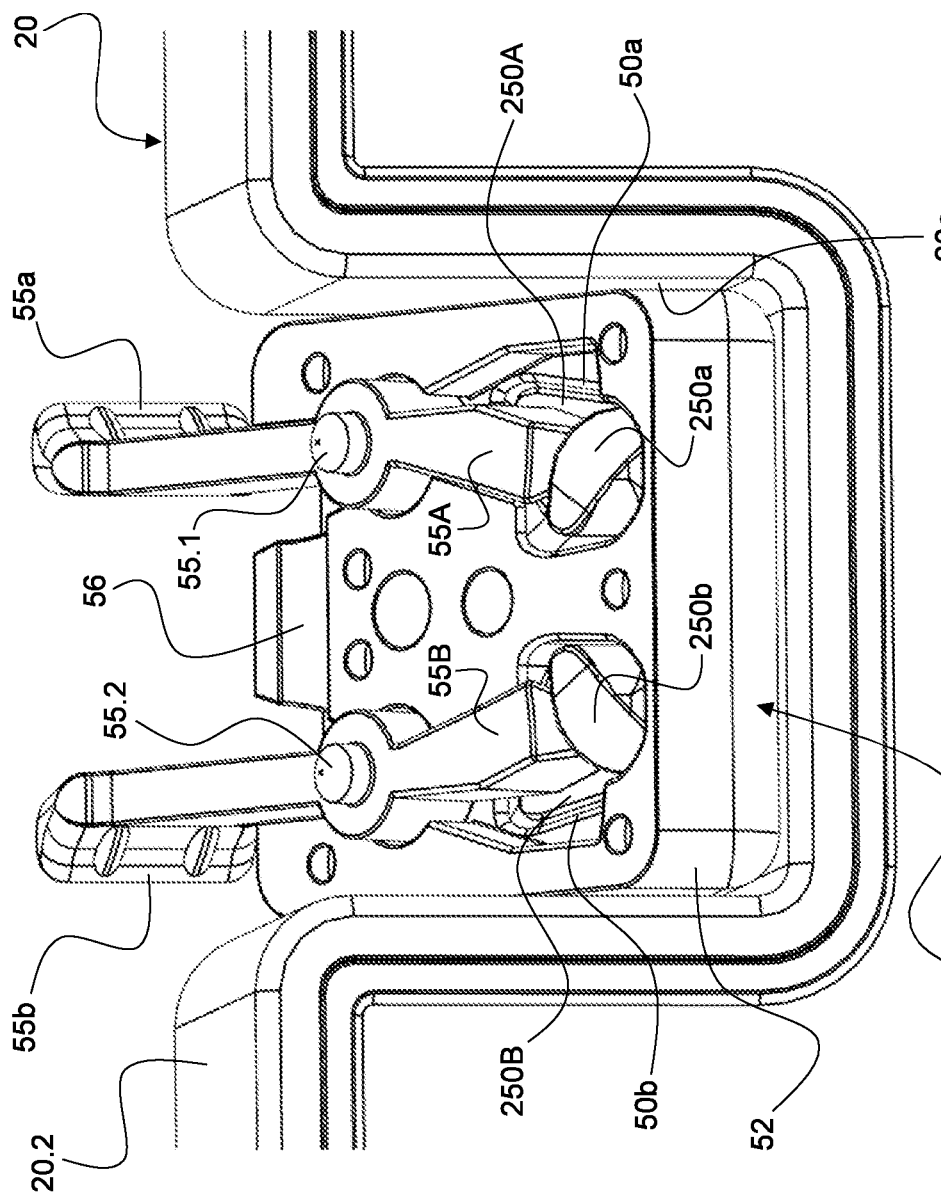
FIG. 5 is an enlarged partial perspective view of a part of the spring-loaded interlocking mechanism of FIG. 4E coupled to the pair of interlocking members of the body fluid collection container, with an upper housing part of the spring-loaded interlocking mechanism being omitted for the sake of illustration.

As this is more readily visible in FIG. 5, each release lever 55a, 55b is preferably supported (here between the upper and lower housing parts 51, 52 of the interlocking mechanism 50) so as to pivot about a pivot point 55.1, respectively 55.2, thereby allowing each release lever 55a, 55b to move between a first position (as depicted in FIG. 5) in which the locking portion 55A, respectively 55B, engages with the locking section 250A, respectively 250B, (thereby preventing disengagement of the body fluid collection container 20) and a second position in which the locking portion 55A, respectively 55B, is disengaged from the locking section 250A, respectively 250B, (thereby allowing disengagement of the body fluid collection container 20).

By default, when no action is applied on the release levers 55a, 55b, the release levers 55a, 55b are pushed to the aforementioned first position under the action of a spring element (not shown) located in a recess portion 56 (see FIG. 5) between the two release levers 55a, 55b.

The geometry and arrangement of the locking extensions 250a, 250b and of the release levers 55a, 55b (especially the shape of the leading, frontal face of the locking extensions 250a, 250b and the shape of the locking portions 55A, 55B) is chosen in such a way that insertion of the locking extensions 250a, 250b inside the associated locking apertures 50a, 50b causes the release levers 55a, 55b to be pivoted away from their first, engaging position, towards the second, disengaging position. Upon full and complete engagement of the container 20, the release levers 55a, 55b are automatically pushed back to the first, engaging position under the action of the associated spring element, thereby locking the container 20 in place on the interlocking mechanism 50. Disengagement of the container 20 is achieved by simply pressing the two levers 55a, 55b towards each other, against the action of the spring element.

A further advantageous aspect of the invention will now be discussed with reference to FIGS. 1A to 1C, 2A, 2B, 4A to 4E, 7A and 7B, namely in relation to the tubing 30 that is attached to the inlet port 20A of the body fluid collection container 20. Considering that the tubing 30 is connected to the container 20, which is suspended below the meter unit 10, movement of the tubing 30, such as caused by manipulation of the tubing portion 31, may negatively impact the measurement accuracy. To prevent this from happening, a portion of the tubing 30 is preferably secured to a lateral side 10.2 of the body fluid meter unit 10, which in effect isolates the body fluid collection container 20 from any perturbation caused by movement of the tubing 30.

Even more preferably, the tubing 30 includes, as shown, a drip chamber (also referred to as Pasteur drip chamber) 32 placed upstream of the inlet port 20A of the body fluid collection container 20, which drip chamber 32 is secured to the lateral side 10.2 of the body fluid meter unit 10. In the illustrated example, this is advantageously achieved by providing the meter unit 10 with a secondary spring-loaded interlocking mechanism 60, secured to the lateral side 10.2 of the meter unit 10, which secondary spring-loaded mechanism is configured to cooperate and interlock with one or more lateral interlocking members (not visible in FIGS. 1A to 1C) provided on an outer portion of the drip chamber 32.

An inlet port 32A of the drip chamber 32, which is connected to the tubing portion 31, is preferably provided with a venting air inlet 320 including an antibacterial air filtration membrane, which improves the flow of body fluid at the inlet port 20A of the container 20, while preventing bacterial contamination.

Figure 2A:
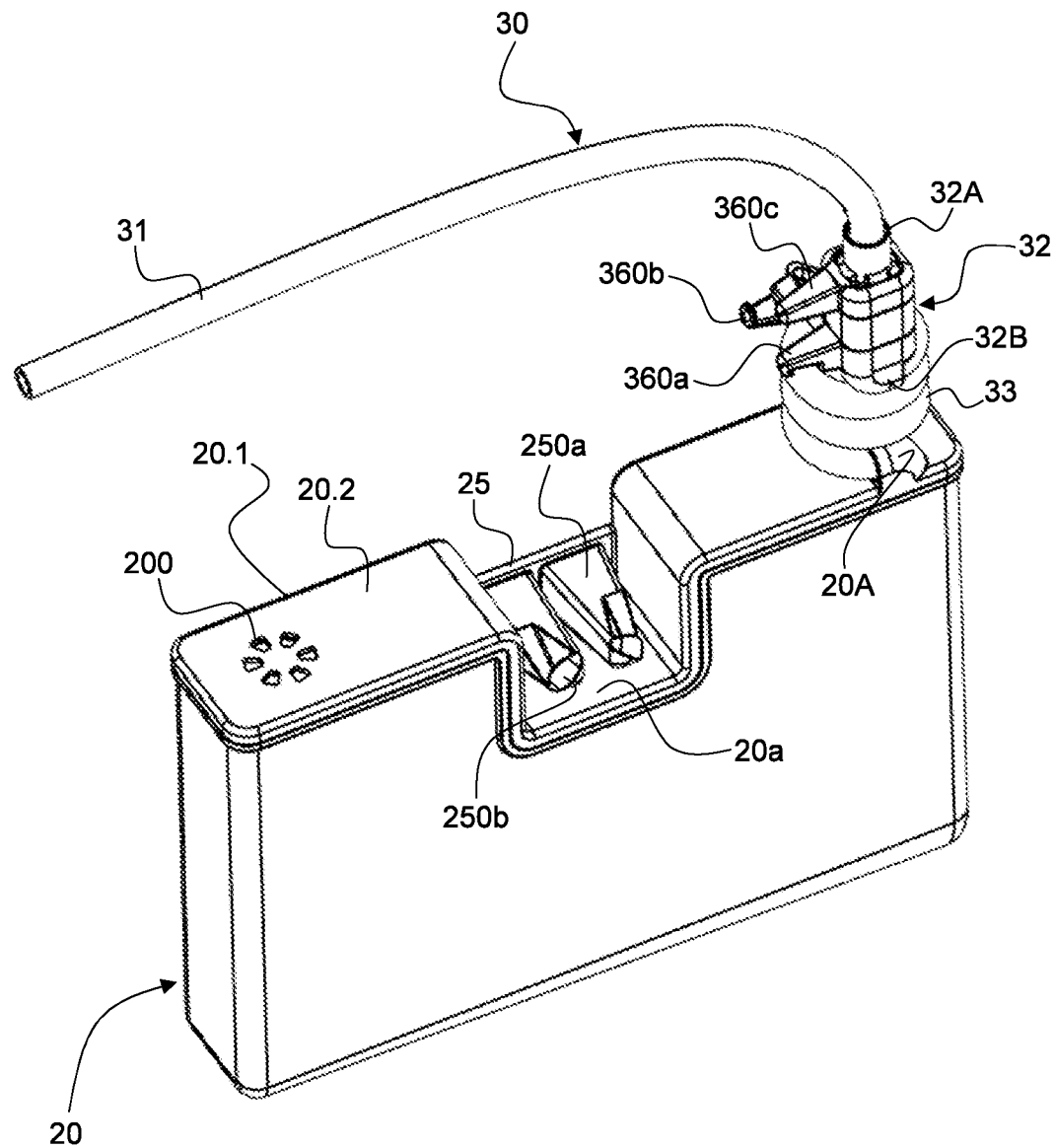
FIG. 2A is a schematic perspective view of the assembly of FIGS. 1A to 1C, with the body fluid meter unit removed from the body fluid collection container and showing the body fluid collection container and associated tubing from a rear side.
Figure 2B:
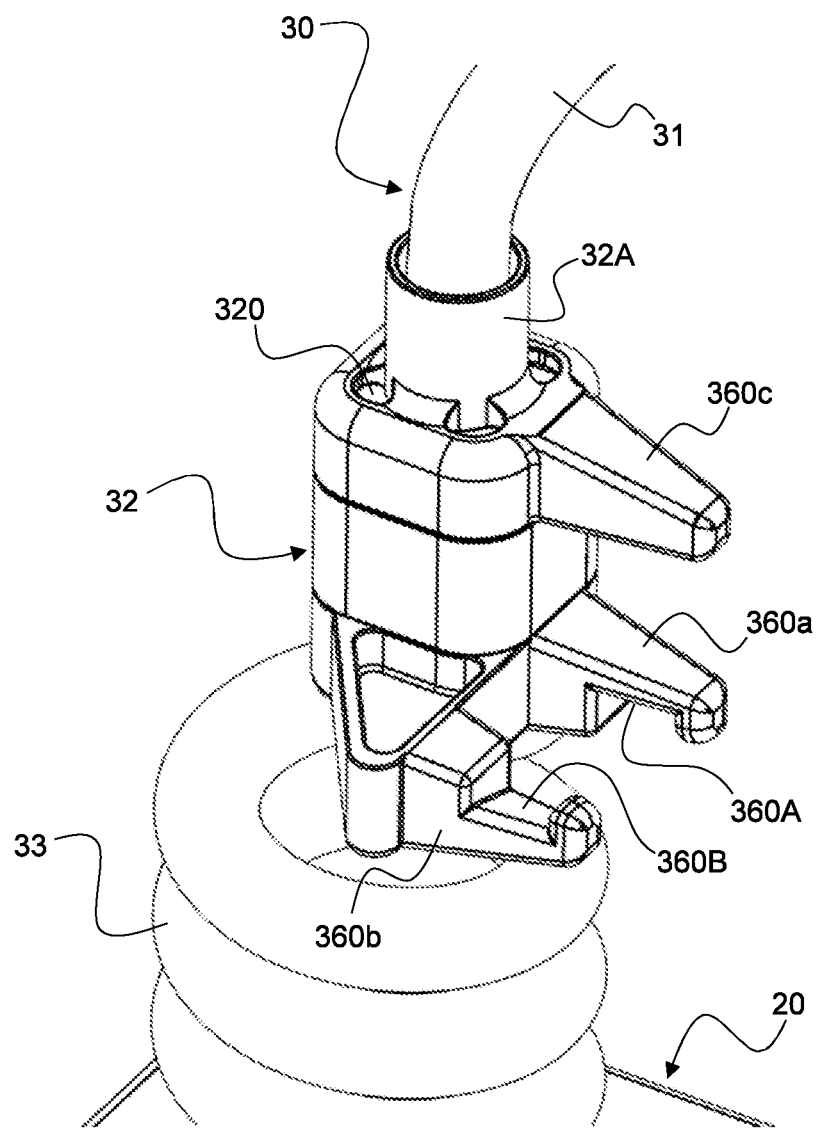
FIG. 2B is an enlarged partial perspective view of a portion of the tubing upstream of the inlet port of the body fluid collection container where a drip chamber is provided.
Figure 3A:
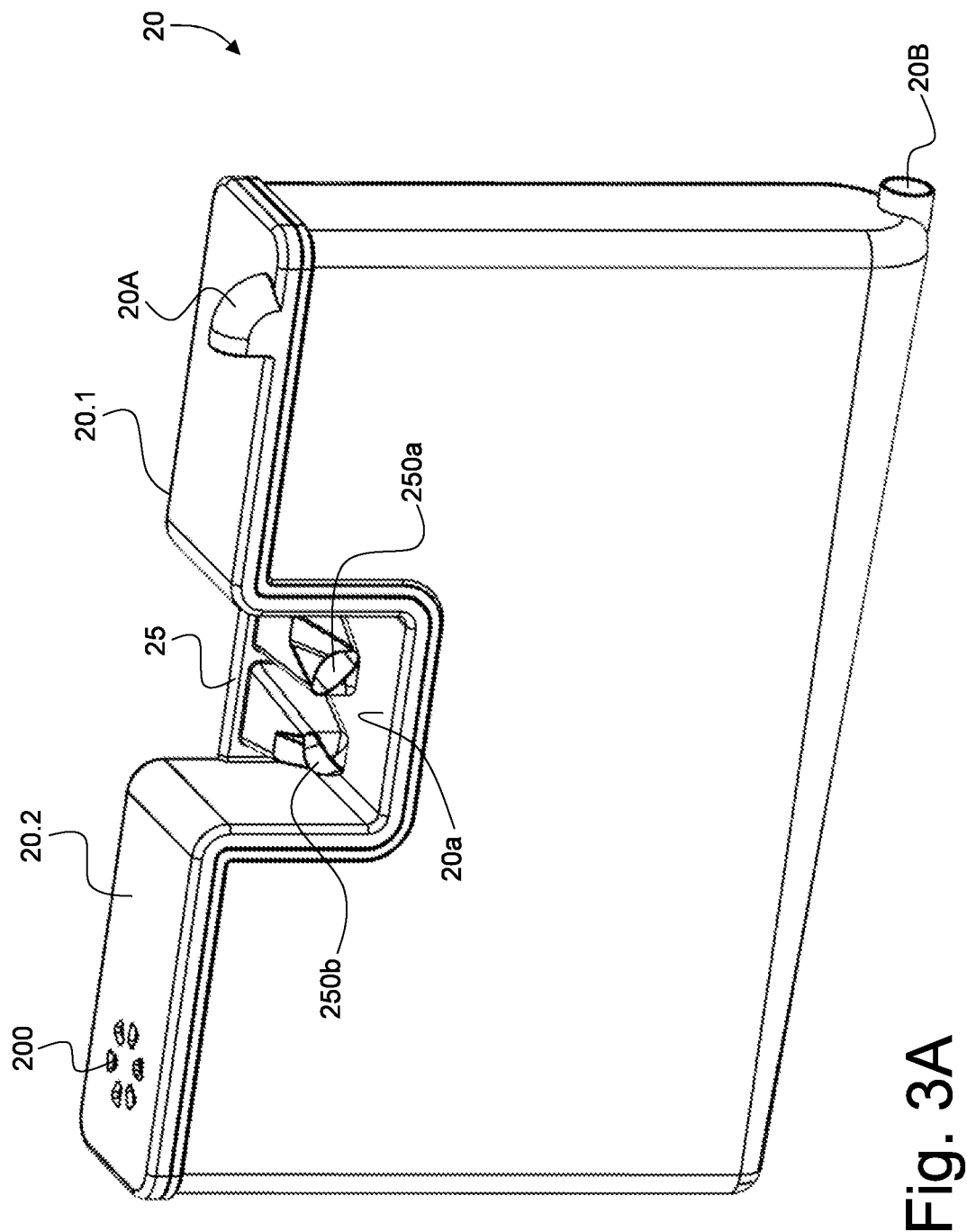
FIG. 3A is a schematic perspective view, as seen from a rear side, of the body fluid collection container forming part of the assembly shown in FIGS. 1A to 1C.
Figure 3B:
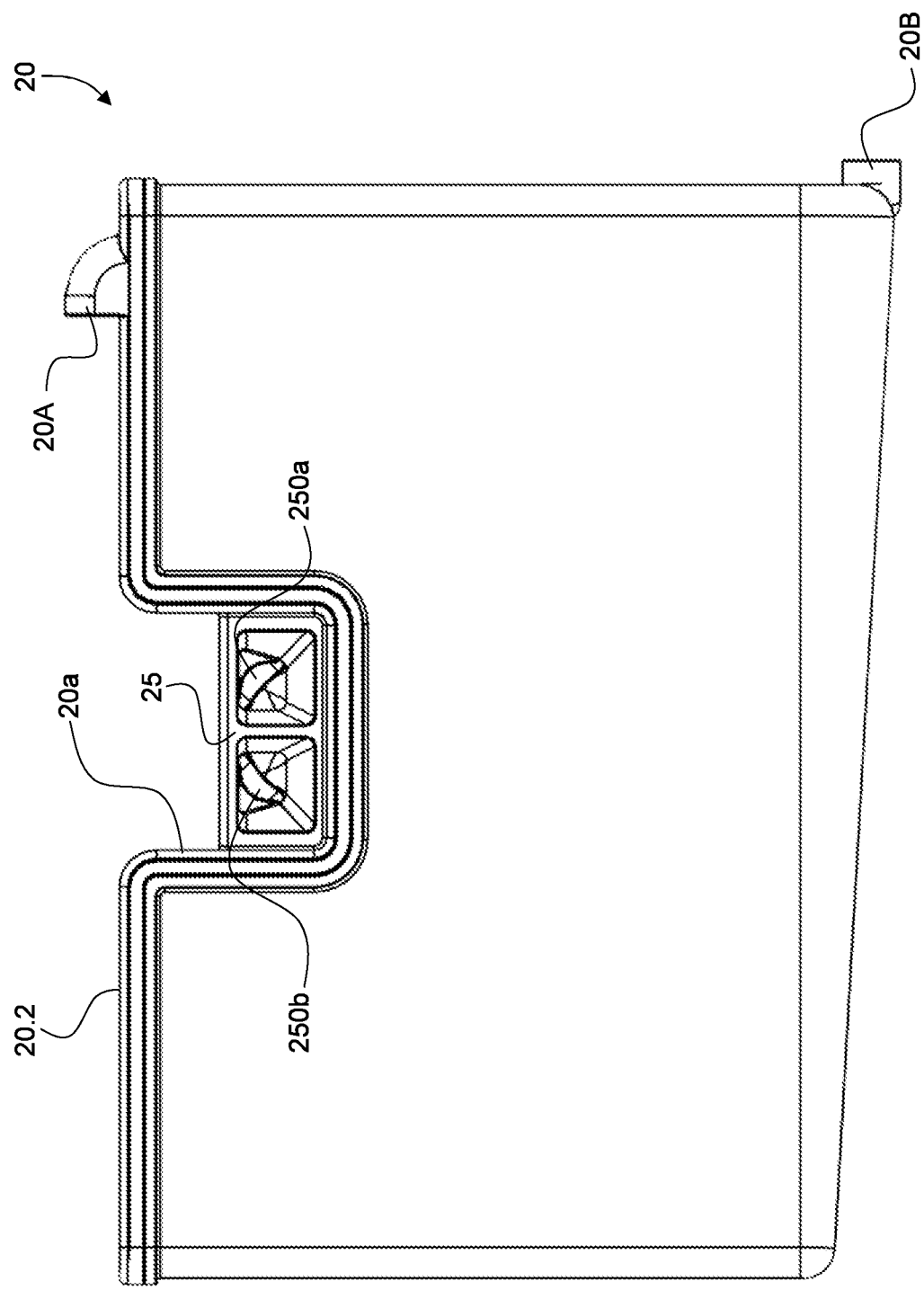
FIG. 3B is a rear view of the body fluid collection container of FIG. 3A.
Figure 3C:
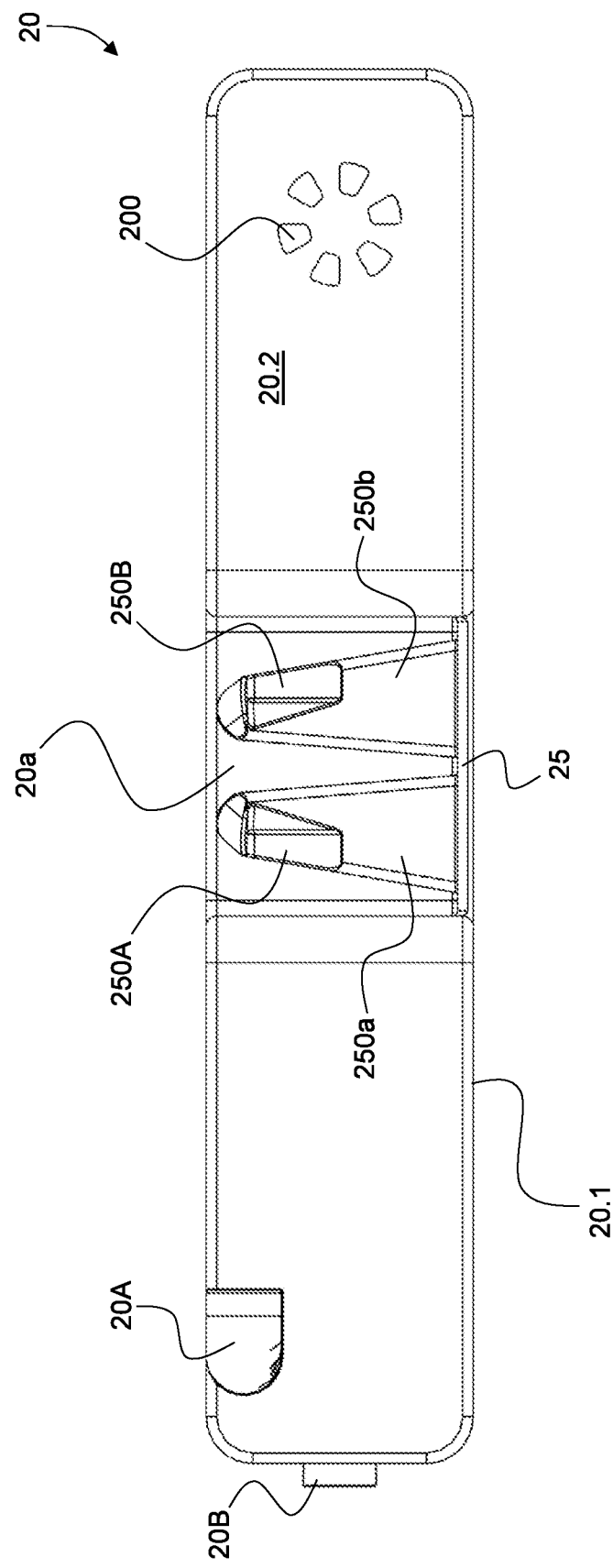
FIG. 3C is a top view of the body fluid collection container of FIG. 3A.
Figure 3D:
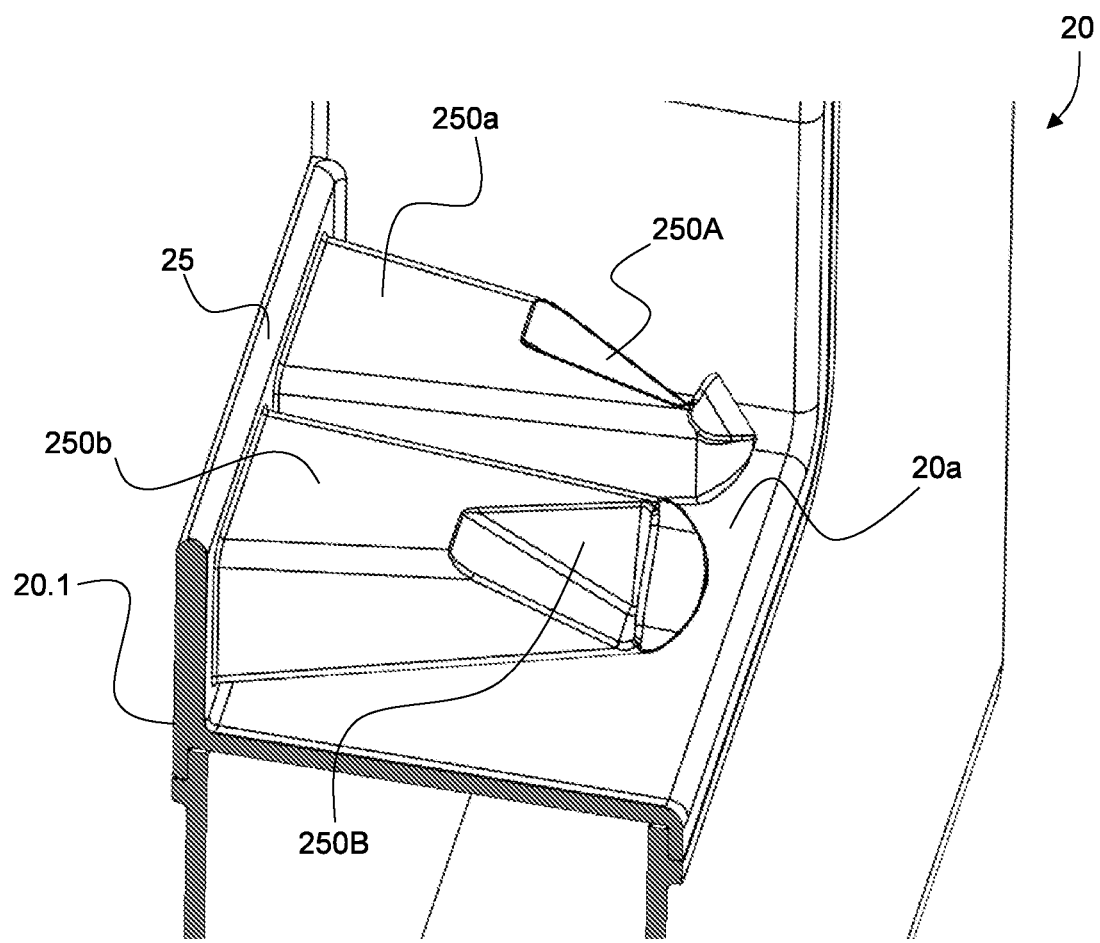
FIG. 3D is an enlarged partial perspective view of an upper portion of the body fluid collection container of FIG. 3A showing a pair of interlocking members used to couple the body fluid collection container to the associated spring-loaded interlocking mechanism of the body fluid meter unit as shown for instance in FIGS. 1A to 1C, 4A to 4E, 5 and 6.

In the illustrated example, a pair of lateral interlocking members are provided for cooperation with the spring-loaded locking mechanism 60, as shown in FIGS. 2A and 2B. More precisely, the drip chamber 32 comprises first and second lateral locking extensions 360a, 360b acting as lateral interlocking members, which lateral locking extensions 360a, 360b project outwardly from the drip chamber 32. Each lateral locking extension 360a, 360b is configured to mate with a corresponding locking aperture 60a, respectively 60b, provided on the secondary spring-loaded interlocking mechanism 60, as depicted for instance in FIGS. 4B and 7A. The overall shape of the lateral locking extensions 360a, 360b and associated locking apertures 60a, 60b may once again vary, but are preferably chosen in such a way as to facilitate engagement and disengagement of the secondary interlocking mechanism 60 with or from the lateral locking extensions 360a, 360b of the drip chamber 32.

The secondary spring-loaded interlocking mechanism 60 is functionally similar to the spring-loaded interlocking mechanism 50 and ensures a stable and reliable connection between the drip chamber 32 and the body fluid meter unit 10. In the illustrated example, the secondary spring-loaded interlocking mechanism 60 includes an outer cover part 61 and an inner cover part 62 secured to the lateral side 10.2 of the body fluid meter unit 10, the outer cover part 61 and inner cover part 62 jointly housing the mechanical components of the secondary spring-loaded interlocking mechanism 60.

By way of preference, the secondary spring-loaded interlocking mechanism 60 comprises at least one secondary spring-loaded release lever cooperating with the aforementioned one or more lateral interlocking members. More precisely, in the illustrated example, one such spring-loaded release lever 65 is provided, as shown in FIGS. 1A, 1C, 4A to 4D, 7A and 7B, for cooperation with both the first and second locking extensions 360a, 360b. In the illustrated example, the spring-loaded release lever 65 comprises first and second locking portions 65A, 65B that are partly visible in FIGS. 4B and 7A and more fully in FIG. 7B. Each locking portion 65A, 65B is configured to cooperate with a locking section 360A, respectively 360B, provided on the corresponding lateral interlocking member 360a, 360b. In the illustrated example, the locking sections 360A, 360B advantageously take the shape of locking indentations (see in particular FIG. 2B) formed at a distal end of the locking extensions 360a, 360b. As this may be appreciated from looking at FIG. 7A and FIG. 7B (where the outer cover part 61 of the secondary spring-loaded interlocking mechanism 60 has been omitted for the purpose of illustration), each locking portion 65A, 65B is positioned in such a way as to engage with the associated locking indentation 360A, respectively 360B, upon full engagement of the drip chamber 32 with the secondary spring-loaded interlocking mechanism 60, thereby locking the drip chamber 32 in place. Conversely, disengagement of the locking portions 65A, 65B from the associated locking indentations 360A, 360B frees the lateral locking extensions 360a, 360b, thereby allowing disengagement of the drip chamber 32 from the secondary interlocking mechanism 60.

Figure 7A:
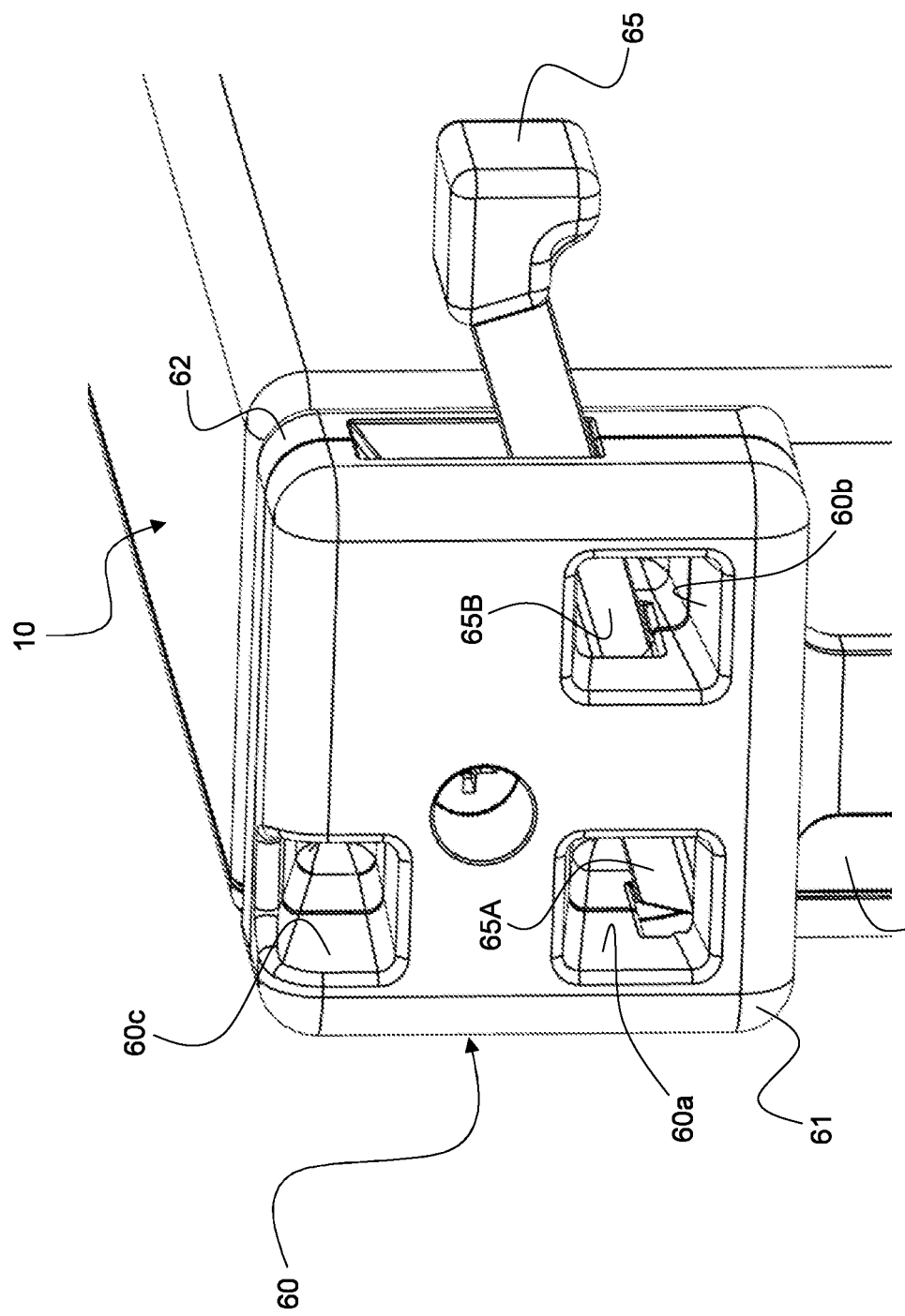
FIG. 7A is an enlarged partial perspective view of a secondary spring-loaded interlocking mechanism provided on the lateral side of the body fluid meter unit for coupling to the drip chamber shown in FIGS. 2A and 2B.
Figure 7B:
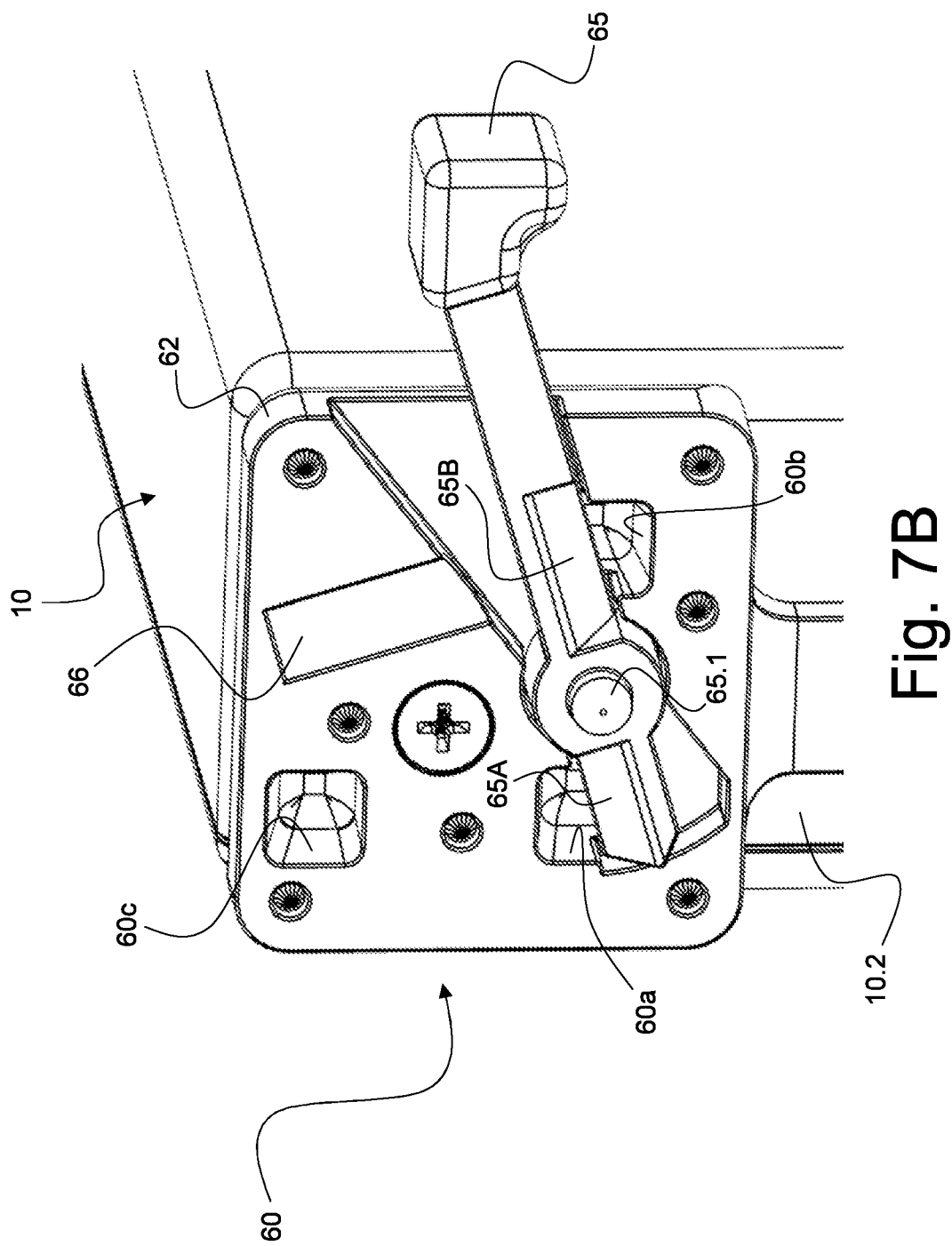
FIG. 7B is an enlarged partial perspective view of a part of the secondary spring-loaded interlocking mechanism of FIG. 7A, with an outer cover part of the secondary spring-loaded interlocking mechanism being omitted for the sake of illustration.

As this is more readily visible in FIG. 7B, the secondary release lever 65 is preferably supported (here between the outer cover part 61 and the inner cover part 62 of the secondary interlocking mechanism 60) so as to pivot about a pivot point 65.1, thereby allowing the release lever 65 to move between a first (lowered) position (as depicted in the illustrations) in which the locking portions 65A, 65B engage with the locking sections 360A, 360B (thereby preventing disengagement of the drip chamber 32) and a second (raised) position in which the locking portions 65A, 65B are disengaged from the locking section 360A, 360B (thereby allowing disengagement of the drip chamber 32).

By default, when no action is applied on the release lever 65, the release lever 65 is pushed to the aforementioned first, lowered position under the action of a spring element (not shown) located in a blind recess portion 66 (see FIG. 7B) formed in cover parts 61, 62, above the position of the lever 65.

The geometry and arrangement of the locking extensions 360a, 360b and of the release lever 65 (especially the shape of the leading, frontal face of the locking extensions 360a, 360b and the shape of the locking portions 65A, 65B) is chosen in such a way that insertion of the locking extensions 360a, 360b inside the associated locking apertures 60a, 60b causes the release lever 65 to be pivoted away from its first, engaging position, towards the second, disengaging position. Upon full and complete engagement of the drip chamber 32, the release lever 65 is automatically pushed back to the first, engaging position under the action of the associated spring element, thereby locking the drip chamber 32 in place on the secondary interlocking mechanism 60. Disengagement of the drip chamber 32 is achieved by simply pushing the lever 65 upward, in the illustrated example, against the action of the spring element.

As this can be appreciated from looking at the illustrations of FIGS. 2A, 2B, 4B, 7A and 7B, the drip chamber 32 is advantageously further provided with a guide member 360c formed as a further lateral extension projecting outwardly from the drip chamber 32, which guide member 360c is configured to mate with a corresponding guiding aperture 60c provided on the secondary spring-loaded interlocking mechanism 60 to ensure a stable connection between the drip chamber 32 and the meter unit 10.

In addition to the aforementioned drip chamber 32, the tubing 30 preferably further comprises a flexible tubing portion 33 interposed between an outlet port 32B of the drip chamber 32 and the inlet port 20A of the body fluid collection container 20 as shown in FIGS. 1A to 1C, 2A and 2B. As illustrated, this flexible tubing portion 33 may advantageously be configured as a coiled tubing portion, which adequately copes with the fact that the container 20 is suspended under the meter unit 10 and prevents any interference with the measurement process.

FIG. 8 is a functional block diagram illustrating functional electronic components of the body fluid meter unit 10 in accordance with a preferred embodiment. In the illustrated embodiment, the body fluid meter unit 10 is preferably battery-operated and includes a battery 18 providing power to the body fluid meter unit 10. Also schematically depicted in FIG. 8 is the load cell 15 coupled to the body fluid collection container 20 via the spring-loaded interlocking mechanism 50.

The illustrated meter unit 10 further includes a printed circuit board 100 carrying electronic components necessary to condition and process the sensor signals produced by the load cell 15, including an analog-to-digital (ND) converter 115 coupled to the load cell 15 and designed to convert analog signals from the load cell 15 into processable digital sensor data. The A/D converter 115 is in operative communication with a processing unit 101 (such as a suitable CPU or microcontroller) that is programmed to digitally process the sensor data supplied by the A/D converter to derive the measurement of the quantity and/or flow rate of the body fluid accumulating in the container 20.

The processing unit 101 is preferably in further operative communication with additional electronic components of the body fluid meter unit 10 that are likewise provided on the PCB 100, namely:
  a wireless transceiver 105 configured to establish a wireless communication with a remote receiver and communicate data wirelessly to the remote receiver;
  a near-field communication (NFC) transceiver 106 configured to establish a near-field communication link with an external NFC device;
  a battery controller 118 coupled to the battery 18, which battery controller 118) is configured to monitor a charge status of the battery 18; and
  an accelerometer 120 configured to detect and monitor movement of the body fluid meter unit 10.

The wireless transceiver 105 is in particular of use to wirelessly communicate data representative of the measured quantity and/or flow rate of body fluid to a remote device such as a computer, tablet or the like. Additional software could be implemented on said computer or tablet to provide high-level information to the end-user, such as an indication of the actual flow rate of body fluid being recorded, as well as statistics illustrative of the evolution of the body fluid output and other information relating to the clinical condition of the patient.

The NFC transceiver 106 may especially be of interest to establish a secure communication link between the body fluid meter unit 10 and a configurator device for the purpose e.g. of configurating and setting up the body fluid meter unit 10. This NFC transceiver 106 may in particular be of use for authentication purposes to ensure that only authorized personnel can have administrative access to functionalities and configuration options of the body fluid meter unit 10.

With regard to the battery controller 118, the battery 18 may especially be a rechargeable battery, such as a lithium-ion battery, in which case a suitable monitoring and control of the battery charge status and charge cycle needs to be ensured. Reference numeral 10A in FIG. 8 designates a suitable connector for connection to an external battery charger, which connector 10A is also visible in FIGS. 4A, 4B and 4D, here provided on the lower side 10.1 of the meter unit 10. Reference numeral 10B in FIGS. 4A, 4B and 4D designates a status LED (not shown in FIG. 8) which can be used to provide a visual indication of the power status of the body fluid meter unit 10 and of the charge status of the battery 18.

The accelerometer 120 is of particular interest to detect and monitor movements of the body fluid meter unit 10 that could interfere with or otherwise affect the measurement accuracy. In that respect, movements that could cause spurious sensor signals from the load cell 15 can be detected by the accelerometer and the relevant spurious data be discarded or filtered out. The accelerometer 120 may in particular be a triaxial (or three-dimensional) accelerometer 120 configured to detect movements in all directions.

Further electronic components or functionalities could be contemplated. In particular, the processing unit 101 can be configured to monitor the quantity and/or flow rate of body fluid and allow setting up of corresponding detection thresholds to trigger alarms, such as in case the detected quantity or flow rate of body fluid exceeds or falls under a predetermined detection threshold. An alarm may for instance be set up to be triggered when the body fluid collection container 20 needs to be emptied. In that context, the body fluid meter unit 10 could additionally be provided with an integrated sound-generating device and/or visual indicator to generate an audible and/or visual alarm.

Various modifications and/or improvements may be made to the above-described embodiments without departing from the scope of the invention as defined by the appended claims.

For instance, while the illustrated embodiments show a spring-loaded interlocking mechanism comprising at least one spring-loaded release lever, this preferred feature is optional, and one may alternatively contemplate to design the spring-loaded interlocking mechanism in such a way that release of the interlocking members is caused by insertion of an adequate tool or dedicated release element. The use of one or more spring-loaded release levers is nevertheless preferred in that this greatly facilitates handling operations.

In addition, the spring-loaded interlocking mechanism could alternatively make use of so-called snap-fit interlocking elements that integrate the spring components, namely elements exhibiting elastic interlocking portions or sections. The illustrated embodiment nevertheless remains a preferred solution in that all movable components of the spring-loaded interlocking mechanism are an integral part of the body fluid meter unit, which does not negatively impact the complexity of the associated body fluid collection container. The production costs of the body fluid collection container per se are therefore comparable to those of conventional body fluid collection containers or bags.

LIST OF REFERENCE NUMERALS AND SIGNS USED THEREIN

1 body fluid meter assembly (e.g. diuresis meter assembly)
10 body fluid meter unit of body fluid meter assembly 1 (e.g. diuresis meter unit)
10A battery charger connector
10B status LED
10.1 lower side of body fluid meter unit 10
10.2 lateral side of body fluid meter unit 10
15 load cell (e.g. S-beam type load cell)
18 (rechargeable) battery
20 body fluid collection container of body fluid meter assembly 1 configured to collect body fluid (e.g. urine)
20a recess formed in upper portion of body fluid collection container 20 and configured to receive spring-loaded interlocking mechanism 50
20A inlet port of body fluid collection container 20
20B drainage port of body fluid collection container 20
20.1 front side of body fluid collection container 20
20.2 upper side of body fluid collection container 20
25 wall section extending in recess 20a, along front side 20.1 of body fluid collection container 20 and supporting interlocking members 250a, 250b
30 tubing of body fluid meter assembly 1
31 tubing portion connected to source of body fluid (e.g. urinary catheter)
32 drip chamber
32A inlet port of drip chamber 32
32B outlet port of drip chamber 32
33 flexible tubing portion (e.g. coiled tubing portion) interposed between outlet port 32B of drip chamber 32 and inlet port 20A of body fluid collection container 20
50 spring-loaded interlocking mechanism (coupling mechanism) configured to releasably couple the body fluid collection container 20 to the load cell 15
50a (first) locking aperture of spring-loaded interlocking mechanism 50 configured to receive interlocking member 250a
50b (second) locking aperture of spring-loaded interlocking mechanism 50 configured to receive interlocking member 250b
51 upper housing part of spring-loaded interlocking mechanism 50
51A extension of upper housing part 51 secured to load cell 15
52 lower housing part of spring-loaded interlocking mechanism 50
55a (first) spring-loaded release lever configured to cooperate with interlocking member 250a
55A locking portion of spring-loaded release lever 55a configured to cooperate with locking section 250A provided on interlocking member 250a
55.1 pivot point of spring-loaded release lever 55a
55b (second) spring-loaded release lever configured to cooperate with interlocking member 250b

55B locking portion of spring-loaded release lever 55b configured to cooperate with locking section 250B provided on interlocking member 250b
55.2 pivot point of spring-loaded release lever 55b
56 recess portion configured to receive spring element acting on release levers 55a, 55b
60 secondary spring-loaded interlocking mechanism
60a (first) locking aperture of secondary spring-loaded interlocking mechanism 60 configured to receive interlocking member 360a
60b (second) locking aperture of secondary spring-loaded interlocking mechanism 60 configured to receive interlocking member 360b
60c guiding aperture of secondary spring-loaded interlocking mechanism 60 configured to receive guide member 360c
61 outer cover part of secondary spring-loaded interlocking mechanism 60
62 inner cover part of secondary spring-loaded interlocking mechanism 60 (secured to lateral side 10.2 of body fluid meter unit 10)
65 secondary spring-loaded release lever configured to cooperate with interlocking members 360a and 360b
65A (first) locking portion of secondary spring-loaded release lever 65 configured to cooperate with locking section 360A provided on interlocking member 360a
65B (second) locking portion of secondary spring-loaded release lever 65 configured to cooperate with locking section 360B provided on interlocking member 360b
65.1 pivot point of secondary spring-loaded release lever 65
66 recess portion configured to receive spring element acting on release lever 65
100 printed circuit board (PCB)
101 processing unit (e.g. CPU)
105 wireless transceiver
106 near-field communication (NFC) transceiver
115 analog-to-digital (ND) converter
118 battery controller
120 accelerometer
200 venting air inlet (with antibacterial air filtration membrane) provided on upper side 20.2 of body fluid collection container 20
250a (first) interlocking member (e.g. first locking extension) provided on body fluid collection container 20 and configured to cooperate with spring-loaded interlocking mechanism 50
250A locking section (e.g. locking indentation) of interlocking member 250a configured to engage with (e.g. receive) locking portion 55A of spring-loaded release lever 55a
250b (second) interlocking member (e.g. second locking extension) provided on body fluid collection container 20 and configured to cooperate with spring-loaded interlocking mechanism 50
250B locking section (e.g. locking indentation) of interlocking member 250b configured to engage with (e.g. receive) locking portion 55B of spring-loaded release lever 55b
320 venting air inlet (with antibacterial air filtration membrane) provided at inlet port 32A of drip chamber 32
360a (first) lateral interlocking member (e.g. first lateral locking extension) provided on outer portion of drip chamber 32 and configured to cooperate with secondary spring-loaded interlocking mechanism 60
360A locking section (e.g. locking indentation) of lateral interlocking member 360a configured to engage with (e.g. receive) locking portion 65A of secondary spring-loaded release lever 65
360b (second) lateral interlocking member (e.g. second lateral locking extension) provided on outer portion of drip chamber 32 and configured to cooperate with secondary spring-loaded interlocking mechanism 60
360B locking section (e.g. locking indentation) of lateral interlocking member 360b configured to engage with (e.g. receive) locking portion 65B of secondary spring-loaded release lever 65
360c guide member provided on outer portion of drip chamber 32 and configured to cooperate with secondary spring-loaded interlocking mechanism 60

The invention claimed is:

1. A body fluid meter assembly, comprising:
a body fluid collection container configured to collect body fluid;
a body fluid meter unit comprising a load cell and a coupling mechanism configured to releasably couple the body fluid collection container directly to the load cell, which body fluid meter unit is configured to process sensor data supplied by the load cell and derive a measurement of a quantity and/or flow rate of the body fluid accumulating in the body fluid collection container as a function of load applied on the load cell; and
tubing attached to an inlet port of the body fluid collection container and configured to be connected to a source of the body fluid,
wherein the body fluid collection container is a rigid container and wherein the coupling mechanism is a spring-loaded interlocking mechanism configured to cooperate with one or more interlocking members provided on the body fluid collection container and interlock with the body fluid collection container to form a connection between the body fluid meter unit and the body fluid collection container,
wherein the spring-loaded interlocking mechanism comprises at least one spring-loaded release lever comprising a locking portion configured to cooperate with a locking section provided on a corresponding one of the one or more interlocking members, and
wherein each spring-loaded release lever is supported so as to pivot between a first position in which the locking portion of the spring-loaded release lever engages with the locking section of the corresponding interlocking member and prevents disengagement of the body fluid collection container and a second position in which the locking portion of the spring-loaded release lever is disengaged from the locking section of the corresponding interlocking member and allows disengagement of the body fluid collection container.

2. The body fluid meter assembly according to claim 1, wherein the locking section is shaped as a locking indentation formed at a distal end.

3. The body fluid meter assembly according to claim 1, wherein the body fluid collection container comprises at least one locking extension acting as interlocking member and projecting from the body fluid collection container, each locking extension being configured to mate with a corresponding locking aperture provided on the spring-loaded interlocking mechanism.

4. The body fluid meter assembly according to claim 3, wherein each locking extension projects horizontally from the body fluid collection container.

5. The body fluid meter assembly according to claim 4, wherein each locking extension projects rearward from a front side of the body fluid collection container.

6. The body fluid meter assembly according to claim 1, wherein the body fluid collection container comprises first and second locking extensions acting as interlocking members and projecting from the body fluid collection container, each locking extension being configured to mate with a corresponding locking aperture provided on the spring-loaded interlocking mechanism,
and wherein the spring-loaded interlocking mechanism comprises first and second spring-loaded release levers cooperating respectively with the first and second locking extensions.

7. The body fluid meter assembly according to claim 6, wherein each locking extension projects horizontally from the body fluid collection container.

8. The body fluid meter assembly according to claim 7, wherein each locking extension projects rearward from a front side of the body fluid collection container.

9. The body fluid meter assembly according to claim 1, wherein the spring-loaded interlocking mechanism extends from a lower side of the body fluid meter unit,
wherein an upper portion of the body fluid collection container exhibits a recess configured to receive the spring-loaded interlocking mechanism,
and wherein each interlocking member is located within the recess.

10. The body fluid meter assembly according to claim 1, wherein a portion of the tubing is secured to a lateral side of the body fluid meter unit.

11. The body fluid meter assembly according to claim 10, wherein the tubing includes a drip chamber placed upstream of the inlet port of the body fluid collection container.

12. The body fluid meter assembly according to claim 11, wherein an inlet port of the drip chamber is provided with a venting air inlet including an antibacterial air filtration membrane.

13. The body fluid meter assembly according to claim 11, wherein the body fluid meter unit further comprises a secondary spring-loaded interlocking mechanism provided on the lateral side of the body fluid meter unit, which secondary spring-loaded interlocking mechanism is configured to cooperate and interlock with one or more lateral interlocking members provided on an outer portion of the drip chamber.

14. The body fluid meter assembly according to claim 13, wherein the secondary spring-loaded interlocking mechanism comprises at least one secondary spring-loaded release lever comprising at least one locking portion configured to cooperate with a locking section provided on a corresponding one of the one or more lateral interlocking members.

15. The body fluid meter assembly according to claim 14, wherein the secondary spring-loaded release lever is supported so as to pivot between a first position in which the locking portion of the secondary spring-loaded release lever engages with the locking section of the corresponding lateral interlocking member and prevents disengagement of the drip chamber and a second position in which the locking portion of the secondary spring-loaded release lever is disengaged from the locking section of the corresponding lateral interlocking member and allows disengagement of the drip chamber.

16. The body fluid meter assembly according to claim 14, wherein the locking section is shaped as a locking indentation.

17. The body fluid meter assembly according to claim 14, wherein the drip chamber comprises first and second lateral locking extensions acting as lateral interlocking members and projecting from the drip chamber, each lateral locking extension being configured to mate with a corresponding locking aperture provided on the secondary spring-loaded interlocking mechanism,
and wherein the secondary spring-loaded interlocking mechanism comprises only one said secondary spring-loaded release lever cooperating with both of the first and second lateral locking extensions.

18. The body fluid meter assembly according claim 13, wherein the drip chamber comprises at least one lateral locking extension acting as lateral interlocking member and projecting outwardly from the drip chamber, each lateral locking extension being configured to mate with a corresponding locking aperture provided on the secondary spring-loaded interlocking mechanism.

19. The body fluid meter assembly according to claim 11, wherein the tubing further includes a flexible tubing portion interposed between an outlet port of the drip chamber and the inlet port of the body fluid collection container.

20. The body fluid meter assembly according to claim 19, wherein the flexible tubing portion is configured as a coiled tubing portion.

21. The body fluid meter assembly according to claim 1, wherein the body fluid meter unit comprises a processing unit in operative communication with an analog-to-digital converter coupled to the load cell to convert analog signals from the load cell into digital sensor data,
wherein the processing unit is configured to digitally process the sensor data supplied by the analog-to-digital converter to derive the measurement of the quantity and/or flow rate of the body fluid accumulating in the body fluid collection container.

22. The body fluid meter assembly according to claim 21, wherein the processing unit is in further operative communication with a wireless transceiver configured to establish a wireless communication with a remote receiver and communicate data wirelessly to the remote receiver.

23. The body fluid meter assembly according to claim 21, wherein the processing unit is in further operative communication with a near-field communication (NFC) transceiver configured to establish a near-field communication link with an external NFC device.

24. The body fluid meter assembly according to claim 21, wherein the processing unit is in further operative communication with a battery controller coupled to a battery supplying power to the body fluid meter unit, which battery controller is configured to monitor a charge status of the battery.

25. The body fluid meter assembly according to claim 24, wherein the battery is a rechargeable battery.

26. The body fluid meter assembly according to claim 21, wherein the processing unit is in further operative communication with an accelerometer configured to detect and monitor movement of the body fluid meter unit.

27. A body fluid collection container configured to collect body fluid,
wherein the body fluid collection container is a rigid container comprising one or more interlocking members configured to cooperate and interlock with a spring-loaded interlocking mechanism of a body fluid meter unit comprised in the body fluid meter assembly according to claim 1.

28. The body fluid collection container according to claim 27, wherein at least one of the one or more interlocking members is provided with a locking section configured to cooperate with a locking portion of at least one spring-loaded release lever of the spring-loaded interlocking mechanism.

29. The body fluid collection container according to claim 28, wherein the locking section is shaped as a locking indentation.

30. The body fluid collection container according to claim 27, wherein the body fluid collection container comprises at least one locking extension acting as interlocking member and projecting from the body fluid collection container, each locking extension being configured to mate with a corresponding locking aperture provided on the spring-loaded interlocking mechanism.

31. The body fluid collection container according to claim 30, wherein each locking extension projects horizontally from the body fluid collection container.

32. The body fluid collection container according to claim 31, wherein each locking extension projects rearward from a front side of the body fluid collection container.

33. The body fluid collection container according to claim 27, wherein the body fluid collection container comprises first and second locking extensions acting as interlocking members and projecting from the body fluid collection container, each locking extension being configured to mate with a corresponding locking aperture provided on the spring-loaded interlocking mechanism.

34. The body fluid collection container according to claim 33, wherein each locking extension projects horizontally from the body fluid collection container.

35. The body fluid collection container according to claim 34, wherein each locking extension projects rearward from a front side of the body fluid collection container.

36. The body fluid collection container according to claim 27, wherein an upper portion of the body fluid collection container exhibits a recess configured to receive the spring-loaded interlocking mechanism, and wherein each interlocking member is located within the recess.

37. A body fluid meter unit, comprising a load cell and a coupling mechanism configured to releasably couple a body fluid collection container of the body fluid meter assembly according to claim 1 to the load cell, which body fluid meter unit is configured to process sensor data supplied by the load cell and derive a measurement of a quantity and/or flow rate of the body fluid accumulating in the body fluid collection container as a function of load applied on the load cell,
wherein the coupling mechanism is a spring-loaded interlocking mechanism configured to cooperate and interlock with one or more interlocking members provided on the body fluid collection container.

38. The body fluid meter unit according to claim 37, wherein the spring-loaded interlocking mechanism comprises at least one spring-loaded release lever comprising a locking portion configured to cooperate with a locking section provided on a corresponding one of the one or more interlocking members of the body fluid collection container.

39. The body fluid meter unit according to claim 37, wherein each spring-loaded release lever is supported so as to pivot between a first position preventing disengagement of the body fluid collection container and a second position allowing disengagement of the body fluid collection container.

40. The body fluid meter unit according to claim 37, wherein the spring-loaded interlocking mechanism comprises at least one locking aperture configured to receive and mate with a corresponding locking extension acting as interlocking member projecting from the body fluid collection container.

41. The body fluid meter unit according to claim 37, wherein the spring-loaded interlocking mechanism comprise first and second locking apertures each configured to receive and mate with a corresponding one of first and second locking extensions acting as interlocking members projecting from the body fluid collection container,
and wherein the spring-loaded interlocking mechanism comprises first and second spring-loaded release levers cooperating respectively with the first and second locking extensions.

42. The body fluid meter unit according to claim 37, wherein the spring-loaded interlocking mechanism extends from a lower side of the body fluid meter unit.

43. The body fluid meter unit according to claim 37, wherein a lateral side of the body fluid meter unit is configured to secure a portion of the tubing of the body fluid meter assembly.

44. The body fluid meter unit according to claim 43, wherein the lateral side of the body fluid meter unit is configured to secure a drip chamber of the tubing.

45. The body fluid meter unit according to claim 44, wherein the body fluid meter unit further comprises a secondary spring-loaded interlocking mechanism provided on the lateral side of the body fluid meter unit, which secondary spring-loaded interlocking mechanism is configured to cooperate and interlock with one or more lateral interlocking members provided on an outer portion of the drip chamber.

46. The body fluid meter unit according to claim 45, wherein the secondary spring-loaded interlocking mechanism comprises at least one secondary spring-loaded release lever comprising at least one locking portion configured to cooperate with a locking section provided on a corresponding one of the one or more lateral interlocking members of the drip chamber.

47. The body fluid meter unit according to claim 46, wherein the secondary spring-loaded release lever is supported so as to pivot between a first position preventing disengagement of the drip chamber and a second position allowing disengagement of the drip chamber.

48. The body fluid meter unit according to claim 45, wherein the secondary spring-loaded interlocking mechanism comprises at least one locking aperture configured to receive and mate with a corresponding lateral locking extension acting as lateral interlocking member projecting outwardly from the drip chamber.

49. The body fluid meter unit according to claim 45, wherein the secondary spring-loaded interlocking mechanism comprises first and second locking apertures each configured to receive and mate with a corresponding one of first and second lateral locking extensions acting as lateral interlocking members projecting outwardly from the drip chamber, and wherein the secondary spring-loaded interlocking mechanism comprises only one said secondary spring-loaded release lever cooperating with both of the first and second lateral locking extensions.

50. The body fluid meter unit according to claim 37, further comprising a processing unit in operative communication with an analog-to-digital converter coupled to the load cell to convert analog signals from the load cell into digital sensor data,
wherein the processing unit is configured to digitally process the sensor data supplied by the analog-to-digital converter to derive the measurement of the quantity and/or flow rate of the body fluid accumulating in the body fluid collection container.

51. The body fluid meter unit according to claim 50, wherein the processing unit is in further operative communication with a wireless transceiver configured to establish a wireless communication with a remote receiver and communicate data wirelessly to the remote receiver.

52. The body fluid meter unit according to claim 50, wherein the processing unit is in further operative communication with a near-field communication (NFC) transceiver configured to establish a near-field communication link with an external NFC device.

53. The body fluid meter unit according to claim 50, wherein the processing unit is in further operative communication with a battery controller coupled to a battery supplying power to the body fluid meter unit, which battery controller is configured to monitor a charge status of the battery.

54. The body fluid meter unit according to claim 53, wherein the battery is a rechargeable battery.

55. The body fluid meter unit according to claim 50, wherein the processing unit is in further operative communication with an accelerometer configured to detect and monitor movement of the body fluid meter unit.

* * * * *